US012722133B2

(12) United States Patent
Biffi et al.

(10) Patent No.: US 12,722,133 B2
(45) Date of Patent: Sep. 1, 2026

(54) ENCASED OIL CORE MICROCAPSULES

(71) Applicant: Microcaps AG, Schlieren (CH)

(72) Inventors: Giulia Biffi, Zürich (CH); Luis Rozas, Zürich (CH); Nesrine Ben Hadj Youssef, Zürich (CH); Michael Diener, Zürich (CH)

(73) Assignee: Microcaps AG, Schlieren (CH)

( * ) Notice: Subject to any disclaimer, the term of this patent is extended or adjusted under 35 U.S.C. 154(b) by 527 days.

(21) Appl. No.: 18/036,911

(22) PCT Filed: Nov. 15, 2021

(86) PCT No.: PCT/EP2021/081705
§ 371 (c)(1),
(2) Date: May 15, 2023

(87) PCT Pub. No.: WO2022/106361
PCT Pub. Date: May 27, 2022

(65) Prior Publication Data

US 2023/0415116 A1 Dec. 28, 2023

(30) Foreign Application Priority Data

Nov. 18, 2020 (CH) .................................... 01473/20
Feb. 26, 2021 (CH) .................................... 00214/21

(51) Int. Cl.

| | |
|---|---|
| ***B01J 13/04*** | (2006.01) |
| ***A23L 27/00*** | (2016.01) |
| ***A23P 20/20*** | (2016.01) |
| ***B01J 13/22*** | (2006.01) |
| ***C11D 3/50*** | (2006.01) |

(52) U.S. Cl.
CPC ............. *B01J 13/046* (2013.01); *A23L 27/72* (2016.08); *A23L 27/80* (2016.08); *A23P 20/20* (2016.08); *B01J 13/22* (2013.01); *C11D 3/505* (2013.01)

(58) Field of Classification Search
CPC .......... B01J 13/046; A23L 27/72; A23L 27/80
See application file for complete search history.

(56) References Cited

U.S. PATENT DOCUMENTS 8,337,923 B2 12/2012 Coyne et al.
2015/0352056 A1* 12/2015 Ramachandran ...... A61K 38/39 250/492.1

FOREIGN PATENT DOCUMENTS

| | | | | |
|---|---|---|---|---|
| DE | 60128910 | T2 | 2/2008 | |
| DE | 102006049039 | A1 | 4/2008 | |
| DE | 102007039772 | A1 | 2/2009 | |
| JP | 2005526819 | A | 9/2005 | |
| JP | 2005528383 | A | 9/2005 | |
| JP | 201017641 | A | 1/2010 | |
| JP | 2010532706 | A | 10/2010 | |
| JP | 2017518310 | A | 7/2017 | |
| WO | 03039514 | A1 | 5/2003 | |
| WO | WO-03084516 | A1 * | 10/2003 | ........... A61K 9/4883 |
| WO | 2008043841 | A2 | 4/2008 | |
| WO | 2009024376 | A1 | 2/2009 | |
| WO | 2015187862 | A1 | 12/2015 | |

OTHER PUBLICATIONS

Martins E. et al. “Monodisperse core-shell alginate (micro)-capsules with oil core generated from droplets millifluidic” Food Hydrocolloids 63 (2017) 447e456 (Year: 2017).*
Harvard Apparatus (https://www.harvardapparatus.com/media/harvard/pdf/PHD2000.pdf), accessed Nov. 6, 2025 (Year: 2025).*
Liu, L. et al. “Preparation of monodisperse calcium alginate microcapsules via internal gelation in microfluidic-generated double emulsions” Journal of Colloid and Interface Science 404 (2013) 85-90 (Year: 2013).*
Bonda et al., “Alginate/maltodextrin and alginate/shellac gum core-shell capsules for the encapsulation of peppermint essential oil”, International Journal of Biological Macromolecules, 2020, vol. 162, pp. 1293-1302.
Martins et al., “Monodisperse core-shell alginate (micro)-capsules with oil core generated from droplets millifluidic”, Food Hydrcolloids, 2017, vol. 63, pp. 447-456.
Martins et al., “A novel method of oil encapsulation in core-shell alginate microcapsules by dispersion-inverse gelation technique”, Reactive and Functional Polymers, 2017, vol. 114, pp. 49-57.
Pereda et al., “Characterization of Core-Shell Alginate Capsules”, Food Biophysics, 2019, vol. 14, pp. 467-478.
Martins et al., “Monodisperse core-shell aliginate (micro)-capsules with oil core generated from droplets millifluidic”, Food Hydrocolloids, 2017, vol. 63, pp. 447-456.

* cited by examiner

*Primary Examiner* — Andrew S Rosenthal
(74) *Attorney, Agent, or Firm* — The Webb Law Firm

(57) ABSTRACT

Disclosed is a method for generating capsules with a matrix shell encasing an oil core. The method includes: providing in a first chamber a core-forming emulsion of an aqueous dispersed phase in an oil phase including water and a dissolved gelation-inducing agent, and a first surfactant; providing in a second chamber a second aqueous solution including water and a second surfactant; wherein the first chamber and the second chamber are fluidically connected by one or more channels; guiding the core-forming emulsion from the first chamber through the channel(s) into the second chamber to form a dispersion of the core-forming emulsion in the aqueous solution; mixing the dispersion with an aqueous shell-forming solution including water and a water soluble matrix-forming agent; and reacting the gelation-inducing agent and the matrix-forming agent in the formed dispersion to form capsules of a water insoluble matrix shell encasing an oil core.

28 Claims, 7 Drawing Sheets

1.000
0.800
0.600
0.400
0.200
0.000
Springiness [-]
Retention [-]
7.000
6.000
5.000
4.000
3.000
2.000
1.000
0.000
Peak Force [g]
Retention
Springiness
Peak Force
(a)
(b)
(c)
(d)

ENCASED OIL CORE MICROCAPSULES

CROSS-REFERENCE TO RELATED APPLICATIONS

This application is the United States national phase of International Application No. PCT/EP2021/081705 filed Nov. 15, 2021, and claims priority to Swiss Patent Application No. 01473/20 filed Nov. 18, 2020 and Swiss Patent Application No. 00214/21 filed Feb. 26, 2021, the disclosures of each of which are hereby incorporated by reference in their entireties.

BACKGROUND

Field

The invention relates to a method for generating capsules, particularly microcapsules, with a shell encasing an oil core, as well as a dispersion of microdroplets.

Description of Art

Capsules, particularly microcapsules with particle sizes of less than 1 mm, have found widespread application in the field of pharmaceutics, cosmetics, diagnostics, food and material science. Such capsules may be produced from an emulsion of monodisperse droplets in a continuous phase. Monodispersity increases stability, allows to accurately control volumes in multiple chemical or biological reactions and enables the production of periodic structures. Microfluidics offers an exquisite platform to precisely form monodisperse droplets. The monodisperse droplets can be cured for generating microcapsules for encapsulation of active ingredients such as drugs, fragrances, flavors, peptides, living material, such as bacteria or phages etc., fertilizers, pesticides, and other active substances for well-being.

For many applications, it is desirable to provide capsules with an oil core being encased by a suitable shell. This is mainly due to the fact that many compounds of interest, for example flavors, fragrances, pharmaceutical active ingredients, vitamins, etc., are hydrophobic and/or only well soluble in an oil phase, but not in water. This renders the oil core as an excellent carrier for such compounds of interest. Furthermore, several oils enhance the mechanism of action of these compounds. For example, some compounds, such as vitamins, are taken up only in a sufficient amount by the body in the presence of oil.

In addition to maintaining the structural integrity of the capsule, the shell encasing the core of such capsules can further have certain adjustable characteristics. For example, it may be desirable to avoid that the shell decomposes upon contact with the saliva, but only in the stomach to release the compound of interest. Alternatively, it is conceivable that a certain compound of interest, particularly, an active pharmaceutical ingredient, is only released in the intestine, but not in the mouth or stomach. In addition, it may in some cases be desirable to provide the capsules with mucoadhesive properties for better control of the release of a compound of interest.

SUMMARY

Hitherto known methods for producing capsules from monodisperse droplets show significant limitations. Known methods suffer from a severely limited overall operational capacity and/or from poor reproducibility and size control.

However, controlling the size of the capsules is of utmost importance for various applications, particularly for applications in the pharmaceutical, fragrance and flavor industry. Furthermore, it also important to be able to accurately control the thickness of the shell, because the shell thickness directly influences the release profile of a compound of interest encased in the oil core. Therefore, it is not only important to control the general shell thickness, but also to secure a uniform distribution of the shell thickness over the capsules.

It is therefore a general object to advance the state of the art of generating capsules, particularly microcapsules, having an oil core and a shell encasing the oil core and preferably to overcome the disadvantages of the prior art fully or partially. In favorable embodiments, a method for producing such capsules is provided allowing for accurate control of the capsule size and size distribution. In further favorable embodiments, a method for producing such capsules is provided allowing for controlling the shell thickness.

In a first aspect, the general object is achieved by a method for generating capsules with a matrix shell encasing an oil core, the method comprising the steps:

a. Providing in a first chamber a core-forming emulsion comprising or of an aqueous dispersed phase in an oil phase, the aqueous dispersed phase comprising water and a gelation-inducing agent, the emulsion further comprising a first surfactant;
b. Providing in a second chamber a second aqueous solution, the aqueous solution comprising water and a second surfactant.

The first chamber and the second chamber are fluidically connected by one or more channels, preferably by microchannels. The method further comprises the steps c. Guiding the core-forming emulsion of step a. from the first chamber through the one or more channels into the second chamber to form a dispersion of the core-forming emulsion of step a. in the second aqueous solution of step b.;
d. Mixing the dispersion formed in step c. with an aqueous shell-forming solution, the aqueous shell-forming solution comprising water and a water soluble matrix-forming agent.

The gelation-inducing agent and the matrix-forming agent are configured such that they are capable of undergoing a chemical reaction with each other to form a water insoluble matrix shell. The method further comprises the step e. Reacting the gelation-inducing agent and the matrix-forming agent in the dispersion formed in step c. to form capsules of a water insoluble matrix shell encasing an oil core.

It is understood that steps a. and b. must not necessarily be performed in this order. It may also be possible to first perform step b. and then step a. or perform them simultaneously.

It is understood that the dispersion formed in step c. comprises a plurality of monodisperse droplets comprising core-forming emulsion of step a. within the second aqueous solution as the continuous phase.

It is further understood that the formed oil core being encased by the water insoluble matrix shell may contain minor amounts of residual aqueous dispersed phase, i.e., minor amounts of water. However, the majority of the core is composed of the oil phase. Typically, more than 60 wt %, particularly more than 70 wt %, particularly more than 80 wt %, particularly more than 90 wt %, particularly more than 95 wt %, particularly more than 99 wt %.

Furthermore, the core-forming emulsion is not the emulsion forming as such the core of the final capsule, but also delivers reagents which react and/or diffuse from the core. Thus the core forming-emulsion in step a. is not necessarily fully identical, in particularly not with respect to its composition to the oil core of the final product.

The advantage of the method according to the invention is that step c. generates a microdispersion of an emulsion in water. Thus, in step c. each droplet generated comprises mostly oil of the oil phase of step a., but also the aqueous dispersed phase with the gelation inducing agent of step a. Thus the dispersion formed in step c is a water in oil in water dispersion. The use of step emulsification, i.e., guiding the core-forming emulsion of step a. through the micro-channels, enables to accurately control the size and ensure uniform size distribution of the dispersion formed in step c. Furthermore, the method allows a much more rapid production of capsules than the methods known in the prior art. The method disclosed herein allows for a capsule production of 100 g/h or more, or even up to 500 g/h. The droplets formed are stabilized by the second surfactant and thus their size remains essentially constant upon mixing the dispersion in step d. with the aqueous shell-forming solution, which induces the formation of the water insoluble matrix. Thus, the matrix grows around the stable core, by a chemical reaction between the gelation-inducing agent being present within each droplet and the matrix-forming agent being present in the aqueous shell-forming solution.

In some embodiments, the gelation-inducing agent is dissolved in the water of the aqueous dispersed phase of step a. The advantage of a dissolved gelation-inducing agent is that clogging of the channels is avoided. Particularly carbonates may lead to accumulation of insoluble salts within the channels.

The core forming emulsion provided in step a. may be stable for 60 min to 600 min, preferably from 100 min to 500 min. Such a stability ensures that the droplets are not directly destroyed, particularly during step c. However, the droplet stability is also not too high which would decrease the efficiency of shell formation, i.e., step e.

The matrix-forming agent in step d. is typically dissolved in the aqueous shell-forming solution.

The gelation-inducing agent and the matrix-forming agent are configured such that they are capable of undergoing a chemical reaction with each other to form a water insoluble matrix shell. These may for example be configured to undergo a complexation reaction, an ion-exchange reaction or an interphase limited polymerization reaction.

As used herein, the term "microcapsule" generally refers to a capsule with a particle size of less than 4 mm, preferably between 1 μm and <4 mm, more preferably between 1 μm and <1 mm. Concomitantly, a microdroplet has a droplet size, i.e., a diameter less than 4 mm, preferably between 1 μm and <4 mm, more preferably between 1 μm and <1 mm, and a microchannel has a diameter of typically less than 4 mm, preferably between 1 μm and <4 mm, more preferably between 1 μm and <1 mm.

The first chamber and second chamber are typically separated from each other with the exception of the one or more channels connecting the first chamber with the second chamber. A chamber as used herein is configured for being filled with a solution. Typically, the chambers are closed with the exception of inlets, channels and outlets.

The first chamber has typically a first fluid inlet for introducing, particularly continuously introducing, the core-forming emulsion in step a. into the first chamber and the second chamber has a second inlet for introducing, particularly continuously introducing, the second aqueous solution into the second chamber in step b. The second chamber also has a dispersion outlet for removing, preferably continuously removing, the dispersion formed during step c. from the second chamber.

It is understood that the one or more channels each comprise an inlet opening into the first chamber and an outlet opening into the second chamber. Thus, the one or more channels are directly connected to the first chamber and the second chamber. Typically, the first chamber and the second chamber are fluidically connected by multiple channels, i.e., at least 10, at least 20, at least 30, at least 50 or at least 100 channels. Preferably, the first chamber and the second chamber are fluidic connected by 1 to 10,000,000, preferably 20 to 500,000 channels. Typically, the channels are arranged essentially parallel to each other.

For example, the one or more channels may have a diameter in the range of 0.25 to 2000 μm, preferably 2 to 800 μm. The multiple channels of the membrane are typically micro-channels. For example, each channel may have a cross-sectional area of 0.04 $\mu m^2$ to 4,000,000 $\mu m^2$, preferably 4 $\mu m^2$ to 640,000 $\mu m^2$.

In further embodiments, the aspect ratio of each channel, which is defined as channel length/minimum diameter, 5 to 1000, particularly, 10 to 500, more particularly 10 to 50. In some embodiments, the length of the channel may be in the range of 0.05 mm to 20 mm, particularly between 0.1 mm to 20 mm, particularly 0.1 mm to 5 mm, particularly 0.5 to 20 mm.

In certain embodiments each channel comprises a channel outlet with a cross-sectional area which is larger than the cross-sectional area of the remaining part of the respective channel. In the longitudinal direction, i.e., in the direction of flow, the channel outlet has a typical length of several micrometers, for example 200 μm to 20 mm, preferably 500 μm to 5 mm. The channel outlet may for example be funnel shaped, V-shaped or U-shaped. In some embodiments, the channel outlet may have an elliptical contour. In particular, the channel outlet is not rotationally symmetric, thus having a ratio of length/width of 3 and higher. Hence, the channel outlet may not have a circular or square shaped cross-section. Such a channel outlet enables the detachment of a droplet without external force. As a result, droplet formation of the core-forming emulsion in the second aqueous solution is decoupled and thus essentially independent from the flow rate. According to the Young-Laplace equation, the pressure at an immiscible liquid interface is higher at the channel outlets than in the second reservoir. Thus a pressure gradient along the direction of the flow is generated, which causes the detachment of the fluid thread into individual droplets. Thus a pressure gradient is generated at the end of the channel, which facilitates the detachment of the fluids boundary layer and thus the formation of the individual droplets. When reaching the channel outlet, the pressure gradient of the disperse phase in and outside of the channel a droplet detaches without external force. Such a nozzle is advantageous, as it decouples the flow rates from the emulsification process.

Typically, each channel is defined by channel walls. The channel walls may be curved, i.e., the channel walls may be convexly or concavely shaped towards the channel outlet. Furthermore, each channel may comprise a constriction with a cross-section which is smaller than the cross-section of the rest of the channel and wherein the constriction is arranged adjacent the channel outlet. Thus, the constriction is arranged between the channel outlet and the rest of the channel.

In further embodiments, the cross-sectional area of each channel outlet is 0.12 to 36,000,000 $\mu m^2$, preferably 12 to 5,760,000 $\mu m^2$. In particular, total open area of the second side of the membrane may be 300% to 1500%, preferably 400% to 900%, larger than total open area of the channels at any other given position, such as the main section and/or the channel inlets.

In some embodiments, the one or more channels may be comprised in a membrane separating the first chamber from the second chamber. In such embodiments, the membrane can be flat, for example disc-shaped. The membrane typically has a first side facing the first chamber and a second side, being opposite to the first side and facing the second chamber. Thus, the first side of the membrane may partially limit the first chamber and the second side of the membrane may partially limit the second chamber. The one or more channels, typically multiple channels, extend from the first side to the second side through the membrane. Each channel comprises a channel inlet arranged at the first side, a channel outlet arranged at the second side and a main section being arranged between the channel inlet and channel outlet, wherein the channel outlet comprises a shape deviating from the shape of the main section.

The membrane may typically be a monolayer membrane. That is, the membrane is made from a single piece. Preferably, such a membrane is made from a massive material and does not contain any phase interfaces or transition areas in addition to the multiple channels of the membrane. Such a membrane is advantageous for the quality of the generated droplets, as any phase interfaces and transitions are detrimental to droplet formation and droplet stability.

In some embodiments, the membrane may be exchangeable. The multiple channels of the membrane are typically micro-channels. For example, each channel may have a cross-sectional area of 0.04 $\mu m^2$ to 4,000,000 $\mu m^2$, preferably 4 $\mu m^2$ to 640,000 $\mu m^2$.

In further embodiments, the channel outlet may be wedge-shaped. In particular, the channel outlet may comprise an elliptical cross-section with respect to a transversal plane being perpendicular to the extending channel, i.e., the channel outlet may be larger in a first direction than in a second direction.

In further embodiments, the second side of the membrane comprises a total open area that is larger than the total open area of the first side. Such a membrane has the advantage that high quality droplets are generated, even at flow rates of up to 5 l/h. In some embodiments, the flow rate per channel may be between 1 μl/h to 50 ml/h, preferably 10 μL/h to 5 ml/h.

In certain embodiments, each channel outlet may have an elliptical contour. Thus, the channel outlet may have an elliptical cross-section with respect to a plane being transversal to the extending channel and being parallel to the first or second side of the membrane. Channel outlets with an elliptical contour have a beneficial effect on the quality of the formed droplets, as any edges within the channel may lead to unstable and in homogeneous droplets.

In some embodiments, the membrane is disk-shaped. Such a membrane may have a circular contour. Alternatively, the membrane may have an angular, particularly a triangular or rectangular, contour.

In further embodiments, the membrane comprises 0.06 to 600,000 channels/$cm^2$, preferably 20 to 30,000 channels/$cm^2$.

In some embodiments, the membrane comprises or is made of glass or a polymeric material, such as polymethyl (meth)acrylate or PTFE or of a metallic material, such as steel.

In some embodiments, the oil phase in step a. additionally comprises at least one compound of interest. The compound of interest may comprise or be selected from a protein, small molecule particularly a fragrant or flavor, active pharmaceutical ingredient such as cannabinoids, hemp extracts, caffeine, melatonin or hyaluronic acid; antibody, peptide, enzyme, RNA, DNA, vitamin and micro-organisms. The compound of interest may for example be mixed into the oil phase in a suitable concentration.

In some embodiments, step a. comprises dissolving the gelation-inducing agent in water to form a solution and mixing the formed solution with the oil phase and with the first surfactant. The at least one compound of interest may in these embodiments be already mixed into the oil phase or also added only after the formed solution of the gelation-inducing agent in water is mixed with the oil phase. In some embodiments, mixing the formed solution of the gelation-inducing agent in water with the oil phase and the first surfactant comprises stirring with a stirrer at least 8,000 rpm, preferably at between 10,000 rpm to 20,000 rpm, e.g. at between 13,000 rpm and 15,000 rpm.

In specific embodiments, the at least one compound of interest in the core-forming emulsion, in particular in the oil phase or in the aqueous dispersed phase, is a living organism, in particular a microorganism, such as bacterium, a virus, including a phage, or a single cell. In some embodiments, the living organism may be provided in a dormant state into the core-forming emulsion, in particular in the oil phase or in the aqueous dispersed phase. It is understood that the dormant state of a living organism relates to an inactive state.

The method according to the invention is particular suitable for encapsulating living organisms, because the method exerts only marginal shear forces as compared to the method of the prior art. Furthermore, the encapsulation efficiency is significantly higher than of methods known in the prior art. It is possible to reach encapsulation efficiencies of up to 90% or even up to 95% with respect to the living organism.

In some embodiments, the method is performed at room temperature, which is highly beneficial for encapsulating living organisms, as the viability is increased.

Furthermore, by guiding the core-forming emulsion through the one or more channels, the channel dimension, in particular the channel diameter, dictates the amounts of living organism per droplet and thus the mount of organism per capsule formed. Therefore, by choosing predefined channel dimensions, accurate control of organism loading per capsule is possible.

In some embodiments in which the at least one compound of interest is a living organism, the living organism, such as cells or bacteria is provided by cultivation prior to being added into the core-forming emulsion, in particular in the oil phase or in the aqueous dispersed phase. For example, cultivation may be performed on a suitable nutrient medium, such as agar-agar. In certain embodiments, viability of the living organism is monitored during cultivation and the living organism freeze dried when the viability reaches its maximum and subsequently added to the core-forming emulsion, in particular in the oil phase or in the aqueous dispersed phase.

In certain embodiments it is beneficial to deoxygenate the core-forming emulsion or its components, such as the oil phase or the aqueous dispersed phased and/or the second aqueous solution. Deoxygenating can be achieved by common laboratory techniques, such as degassing with inert gases, such as argon or nitrogen, or by the freeze-pump-thaw technique. Such deoxygenating is beneficial, because the living organism can be maintained in its dormant state.

In some embodiments, the core-forming emulsion, in particular in the oil phase or in the aqueous dispersed phase, additionally comprises nutritional components for the living microorganism, such as sugars, electrolyte solutions, and the like.

In certain embodiments, the core-forming emulsion, in particular in the oil phase or in the aqueous dispersed phase, additionally comprises buffer solutions configured to maintain a pH suitable for the corresponding living organism.

In some embodiments, the dispersion formed in step c. is delivered after step c., to a gelation vessel containing the aqueous shell-forming solution of step d. Thus, the second chamber may comprise an outlet which is fluidic connected to the gelation vessel. Particularly, the dispersion formed in step c. is continuously delivered from the second chamber to the gelation vessel. Alternatively, the dispersion formed in step c. is continuously delivered from the second chamber to an intermediate storage vessel, where it can be stored and a predetermined amount of the dispersion can be collected, before it is delivered to the gelation vessel. It is understood that in these embodiments, the outlet of the second chamber may be fluidic connected to the intermediate storage vessel. The intermediate storage vessel may be fluidic connected to the gelation vessel.

It is understood that in embodiments with a gelation vessel, the gelation vessel typically contains the aqueous shell-forming solution of step d. before the dispersion formed in step c. is delivered to the gelation vessel.

In particular embodiments, the delivered dispersion of the core-forming emulsion of step a. in the second aqueous solution of step b. and the aqueous shell-forming solution are stirred with a stirrer, preferably a mechanical stirrer within the gelation vessel. During step e., stirring may preferably be performed at 50 rpm to 150 rpm, preferably at 100 to 120 rpm. Such a stirring velocity has been found optimal, because it avoids agglutination of the formed capsules and further ensures a uniform size distribution of the capsules, but is low enough so that the growing capsules or generated capsules are not destroyed.

In some embodiments, the oil phase may comprise or consist of medium-chain triglyceride (MCT), menthol, sunflower oil, and the like.

In some embodiments, the first surfactant comprises or is a nonionic surfactant, such as polyglycerol polyricinoleate (PGPR) or Span derivatives (sorbitan ester), such as Span 80 or Span 85 or a combination thereof. Furthermore, the first surfactant may be a solid particle, depending on the application preferably a hydrophobic hydrophilic or Janus-type particle, configured for providing a pickering emulsion. For example, the solid particle may be colloidal silica.

Preferably the first surfactant, particularly the non-ionic surfactant, has a molecular weight of between 600 and 120,000 g/mol, preferably between 800 and 80,000 g/mol.

Nonionic surfactants have been found suitable for providing sufficient stabilization for the microdroplets of the aqueous dispersed phase in the core-forming emulsion. PGPR has been found to be advantageous, as it stabilizes the core-forming emulsion sufficiently so that the microdisperse droplets of the aqueous dispersed phase do are not immediately destroyed, particularly during guiding the emulsion through the channels, but does also not stabilize the microdroplets too much, as this decreases the efficiency of the diffusion process of the gelation-inducing agent to the interface of the droplet in step e. such that it can react with the matrix forming agent. Stabilization is important, as during step c. the microdroplets are exposed to significant shearing forces, which may destroy the microdroplets of the aqueous dispersed phase in the core-forming emulsion.

In some embodiments, the amount of first surfactant in the core-forming emulsion is between 0.01 wt % and 0.80 wt %, preferably between 0.05 wt % and 0.12 wt %.

In some embodiments, the amount of the second surfactant in the second aqueous solution is between 0.5 wt % and 5 wt %, in particular 1 wt % to 2 wt %.

In some embodiments, the second surfactant has a molecular weight of between 600 and 120,000 g/mol, preferably between 800 and 80,000 g/mol.

Typically, the first surfactant and the second surfactant are different and thus not identical.

In some embodiments, the second surfactant comprises or is selected from polyvinylalcohol (PVA), a polysorbate, such as Tween 20 or Tween 80, saponins, sapogenins, i.e., quillaja extract, gum Arabic, beta lactoglobulin, sodium dodecyl sulfate, soy lecithin, sodium caesinate, potato protein isolate (for example Solanic 300, Avebe®), whey protein isolate, starch octenyl succinate or a combination thereof. Preferably from polyvinylalcohol, a polysorbate, such as Tween 20 or Tween 80, beta lactoglobulin and starch octenyl succinate. With polyvinylalcohol, a polysorbate, such as Tween 20 or Tween 80, beta lactoglobulin and/or starch octenyl succinate a relatively thick and stable shell as compared to other second surfactants has been obtained. Polyvinylalcohol additionally provided an excellent monodispersity of the droplets of the core-forming emulsion in the second aqueous solution.

Furthermore, the second surfactant may be a solid particle, depending on the application preferably a hydrophobic hydrophilic or Janus-type particle, configured for providing a pickering emulsion. For example, the solid particle may be colloidal silica. If PVA shall be avoided, gum arabic, Tween 20, potato protein, pectin or mixtures thereof may be employed as second surfactant, respectively as PVA replacement. Particular suitable examples include the use of 1 wt %-5 wt %, particularly 2 wt % to 4 wt %, of gum Arabic (for example Agri-Spray Acacia RE, Agrigum®) together with 0.25 wt % to 4 wt %, particularly 1 wt % to 2 wt %, of Tween 20 as the second surfactant in the second aqueous solution; or 0.5 wt % to 5 wt %, particularly 1 wt % to 3 wt %, of potato protein isolate (for example Solanic 300, Avebe®) as the second surfactant in the second aqueous solution; or 0.5 wt % to 5 wt %, particularly 0.5 wt % to 2 wt %, of pectin (for example sugar beet pectin: Swiss Beta Pectin, Schweizer Zucker AG®) together with wt % to 4 wt %, particularly 1 wt % to 2 wt %, of Tween 20 as the second surfactant in the second aqueous solution. With these examples as second surfactant, a size distribution with a coefficient of variation of below 10% is readily possible. In some embodiments in which potato protein isolate is employed as the second surfactant, the pH of the second aqueous solution is adjusted to pH 9-11, preferably to pH 10.

In some embodiments, the matrix-forming agent comprises or is a polysaccharide or suitable salt thereof. A suitable salt is a salt form which can be completely dissolved in water. Typically, polysaccharide salts are comprised of an anionic polysaccharide component and a suitable counter cation. Suitable polysaccharides are selected from chitosan, cellulose, alginate, particularly sodium alginate, carrageenan, agar, agarose, pectins, gellan, starch, and the like. Preferred polysaccharides are alginate, preferably sodium alginate, chitosan, carrageenan and cellulose, more preferably alginate, preferably sodium alginate, chitosan. In some embodiments, the polysaccharides may be solubilized by adjusting the pH, for example by basifying the pH of the aqueous shell-forming solution.

In some embodiments, the matrix-forming agent and the gelation-inducing agent are selected such that the formed water insoluble matrix breaks and/or melts at a temperature of at least 80° C., in particular of at least 90° C. Such embodiments, have the advantage that a compound of interest within the capsules is released at a specific, predetermined temperature. This is for example of particular interest for capsules being used as food additives. Such capsules may be completely odorless when they are intact, but break when they are cooked, such that the odor of interest is only liberated during cooking. In certain embodiments, the gelation inducing agent may comprise or be an alkaline earth metal salt, particularly a calcium salt such as $CaCl_2$, or an alkaline metal salt, such as KCl, and the matrix forming agent may be carrageenan, or a mixture of carrageenan and sodium alginate, preferably in a ratio of 2:1 to 1:2. Alternatively agar-agar, optionally combined with sodium alginate, may be used as matrix forming agent in such embodiments. Preferably, 0.25 wt % to 2 wt %, in particular 0.5 wt % to 1.5 wt of carrageenan are used in the aqueous shell-forming solution. For example, if 1.5 wt % of carrageenan in water is used in step d. as the aqueous shell-forming solution, capsules are formed which start to melt at 80° C. If on the other hand, 0.75 wt % carrageenan together with 0.5 wt % sodium alginate in water is used in step d. as the aqueous shell-forming solution, then capsules are formed which are more stable and break open at around 80° C., but do not yet melt completely.

Alternatively, the matrix-forming agent may comprise or be a polycarboxylate. In this case, the gelation inducing agent may be an inorganic salt as describe above which can form a water insoluble matrix upon ion exchange with the polycarboxylate. Alternatively, the gelation-inducing agent may comprise or be a polyammonium salts, i.e., a polymer comprising a plurality of polyammonium groups.

As an alternative, the matrix-forming agent may comprise or be a monomer being soluble in the water phase but not in the oil. Such a monomer must be selected such that it can undergo a step-growth polymerization, for example a diamine. In this case the gelation-inducing agent is a monomer being soluble in the oil phase but not in water, such as a diacid chloride, thereby enabling an interface polymerization during step e for forming the water insoluble matrix.

In some embodiments, the amount of matrix-forming agent in the aqueous shell-forming solution is between 0.1 wt % to 2 wt %, preferably between 0.5 wt % to 1.0 wt %.

In some embodiments, a third surfactant, for example a Polysorbate, such as Tween 20 may be present in or added to the aqueous shell-forming solution prior to step d. It has been found that such a third surfactant improves the gelation reaction.

In some embodiments, the gelation-inducing agent comprises or is an inorganic salt, particularly an alkaline earth metal salt, particularly an alkaline earth metal halide, an alkaline earth metal pseudohalide, an alkaline earth metal carboxylate or an alkaline earth metal nitrate, or an alkaline metal halide, an alkaline metal pseudohalide, an alkaline metal carboxylate or an alkaline metal nitrate. In some embodiments in which the gelation-inducing agent is an inorganic salt, as outlined above, the reaction in step e. between the gelation-inducing agent and the matrix-forming agent is an ion exchange reaction, i.e. an ionotropic gelation. Thus, the inorganic salt (and vice versa the matrix-forming agent) are selected such that its reaction with the matrix-forming agent results in a water insoluble reaction product. Particularly suitable salts, especially for polysaccharides, may thus be K, Mg, Sr or Ca salts. The skilled person understands the term "pseudohalide", which is also referred to as "pseudohalogenide" as polyatomic analogues of halogens, whose chemistry resembles that of true halogens. Non-limiting examples include cyanide, isocyanide, cyanate, isocyanate, methylsulfonyl and triflyl. Non limiting examples of carboxylates are acetate, formate, lactate, oxalate, butyrate, succinate and the like. The gelation-inducing agent is typically selected such that it is completely soluble in water at room temperature, i.e. has a solubility in water of >10 g/100 mL, preferably of >20 g/100 mL, particularly of >50 g/100 mL. Non-limiting examples of suitable gelation-inducing agents are: $CaCl_2$, $CaF_2$, Calcium lactate, $MgCl_2$, $Sr(OAc)_2$.

The inorganic salt is typically a water soluble salt. However, it also conceivable to employ a powder of a water insoluble salt as gelation-inducing agent. For example, it may be possible to employ $CaCO_3$ or $MgCO_3$, particularly as a powder.

In some embodiments, the gelation-inducing agent is a composition of a photoacid generator, i.e. a compound being configured to produce an acid upon irradiation, preferably UV irradiation, such as diphenlyiodonium nitrate, and chelate of an inorganic salt, particularly an alkaline earth metal salt or an alkaline metal salt. The chelate may for example be a chelate of a carboxylic acid. A suitable example may be a chelate of strontium an ethylene glycol tetraacetic acid. Upon irradiation with UV light, which may be performed in step e., the photoacid generator generates an acid, which then liberates the strontium ions, which in turn react with the matrix-forming agent, for example with sodium alginate to form a water insoluble matric shell.

In some embodiments, the gelation-inducing agent is $CO_2$ or a $CO_2$ generator. A $CO_2$ generator can liberate $CO_2$ under specific conditions. For example, bicarbonate may liberate $CO_2$ in the presence of an acid.

In some embodiments, the gelation inducing agent may be a Bronsted acid, for example a mineral acid or a carboxylic acid. In this case, the matrix-forming agent may be a composition of a polysaccharide, such as an alginate, chitosan, etc. and a suitable water soluble alkaline metal complex or alkaline earth metal complex, such as Ca-$Na_2$-EDTA, Mg-$Na_2$-EDTA, Sr-$Na_2$-EDTA and the like.

In some embodiments, the amount of the gelation-inducing agent in the core-forming emulsion is between 1.5 wt %-7.0 wt %, preferably between 2.0 wt % to 5.0 wt %.

In some embodiments, an alcohol, particularly methanol, ethanol or propanol, is added to the aqueous shell-forming solution prior to step d. It has been found that the alcohol enhances the diffusion of the gelation-inducing agent towards the interface of the microdroplets. The alcohol is typically present in an amount of 10 to 30 wt % of the aqueous shell-forming solution. It has been observed that of the alcohol amount is between 10 to 20 wt %, preferably at 13 to 17 wt %, the core size of the capsule, i.e. the core diameter, is larger than if more ethanol is used. For example, a microcapsule diameter of larger than 300 μm can be achieved. If the amount of alcohol is between 20 to 30 wt %, preferably at 23 to 27 wt %, (under otherwise identical conditions) the core size of the capsule, i.e. the core diameter, is smaller. For example, a microcapsule diameter of less than 300 μm can be achieved.

In some embodiments, an osmosis regulator is added to the aqueous shell-forming solution prior to step d. The osmosis regulator is configured for enhancing diffusion of the gelation-inducing agent towards the interface of the microdroplets, thereby increasing shell thickness and stability of the capsule. The osmosis regulator may comprise or be an alcohol as described above or a sugar, for example, a monosaccharide or a disaccharide, i.e., glucose or fructose. Such a sugar derivative may be used alone or in combination with an alcohol as described above.

In some embodiments, a structural stabilizer may be added to or being present in the aqueous shell-forming solution prior to step d. A structural stabilizer are compounds configured for enhancing the structural stability of the shell. Examples comprise or include agarose as well as xanthan gum or cellulose and derivatives, for example methylcellulose or microcrystalline cellulose, and the like. These may typically be present in the shell-forming solution which are then integrated into the growing shell during step e.

In some embodiments, the aqueous shell-forming solution of step d. comprises in addition to the matrix-forming agent, an additional biopolymer as structural stabilizer, such as pectin (for example GENU® pectin type LM-104 AS-FG). Preferably, the additional biopolymer may also be able to form a matrix shell.

In certain embodiments, the additional biopolymer may be solid biopolymer particles, e.g. starch. Providing such an additional biopolymer and in particular solid biopolymer particles increases the mechanical strength of the generated capsules.

In some embodiments, the concentration of the additional biopolymer, and in particular of the solid biopolymer particles in the aqueous shell-forming solution is 1 wt % to 10 wt %, particularly 3 wt % to 7 wt %. Particular suitable solid particles are starch particles, such as corn starch particles.

In some embodiments, the particle size of the solid particles is equal or less than 20 μm, particularly equal or less than 15 μm.

In some embodiments, the ratio of oil core diameter of the produced microcapsules to particle size of the solid biopolymer particles is between 10:1 to 100:1, preferably 20:1 to 60:1.

In some embodiments, step e. is performed at temperatures above room temperature, in particular between 25° C. and 95° C., particularly between 40° C. and 85° C., particularly between 50° C. and 80° C., particularly between 65° C. and 80° C., particularly between 70° C. and 80° C. Additionally, or alternatively, after step e. the formed capsules are exposed to temperatures above room temperature, in particular between 25° C. and 95° C., particularly between 40° C. and 85° C., particularly between 50° C. and 80° C., particularly between 65° C. and 80° C., particularly between 70° C. and 80° C. For example, exposure to such temperatures may be performed for 5 min to 60 min, in particular from 15 min to 30 min. It has been found that increasing the temperatures during or after step e. has a significant effect on the mechanical strength of the particles. Without wishing to be bound to a theory, it is assumed that the biopolymer, such as for example solid starch particles, form a more extensive network after gelatinization at elevated temperatures, which entails the higher mechanical strength of the capsules.

In some embodiments, the capsules may after step e. be exposed to a solution of an additional polysaccharide. Typically, it may be a different polysaccharide then the matrix forming agent of step d. Suitable polysaccharides are selected from chitosan, cellulose, alginate, particularly sodium alginate, carrageenan, agar, agarose, pectins, gellan, starch, and the like, preferably chitosan.

In further embodiments, a pressure of 1.01 bar to 1.15 bar, preferably of 1.03 bar to 1.07 bar is applied to the first chamber, particularly during step c., and/or a pressure of 1.02 bar to 1.2 bar, preferably of 1.05 bar to 1.1 bar is applied to the second chamber particularly during step c. It is understood that these pressure values relate to absolute pressures, i.e. a pressure of 1.01 bar is a pressure which constitutes an overpressure of 0.01 bar with respect to the atmospheric pressure.

In some embodiments, the pressure applied to the first chamber is smaller than the pressure applied to the second chamber. It is understood that the first pressure can be adjusted by the pressure with which the core-forming emulsion is provided via the first fluid inlet of the first chamber to the first chamber and/or the second pressure can be adjusted by the pressure with which the second aqueous solution of step b. is provided via the second fluid inlet of the second chamber to the second chamber.

In some embodiments, mixing in step d. is performed with a stirrer stirring with 10 rpm to 800 rpm, preferably with 50 rpm to 700 rpm. Mixing during step d. is beneficial, as it further avoids agglutination of the monodispersed droplets of the dispersion formed in step c. and/or formed capsules. Thus, this further ensures a uniform size distribution of the capsules. Typically, an overhead stirrer may be employed.

In certain embodiments, the aqueous shell-forming solution is stirred with a stirrer at 500 rpm to 800 rpm prior to step d and wherein during step d. is stirred at 50 rpm to 150 rpm, preferably at 100 to 120 rpm. Thus, before the dispersion formed in step c. is mixed with the aqueous shell-forming solution, the aqueous shell-forming solution is more vigorously stirred in order to ensure uniformity of the aqueous shell-forming solution. During the addition, the stirring velocity is decreased and is thus low enough so that the growing capsules or generated capsules are not destroyed.

In some embodiments, step e. is performed for 5 min to 25 min, preferably for 8 min to 12 min or for 15 min to 20 min. The reaction time of step e. i.e. the time until the reaction is interrupted, for example by separating or isolating the capsules from the aqueous shell-forming solution, directly influences the particle size and the core size of the capsules. For example, an oil core with an average diameter of less than 600 μm can be achieved if step e. is performed for 8 min to 12 min and an oil core with an average diameter of larger than 600 μm can be achieved if step e. is performed for 15 min to 20 min. The skilled person knows several methods for determining the particle size, for example sieving with sieves having different mesh sizes.

In some embodiments, the method further comprises after step e. an additional encasing step, which particularly may comprise dip coating. The additional encasing step may in some embodiments comprise the steps f. Immersing the capsules formed in step e. in a further aqueous shell-forming solution, the further shell forming solution being typically different from the shell-forming solution in step d. The further shell forming solution comprising water and a pH dependent matrix forming agent and optionally an inorganic salt, preferably an alkaline earth metal salt or an alkaline metal salt;

g. Adjusting the pH such that the matrix forming agent, i.e. the pH dependent matrix forming agent of step f., is transformed into a water insoluble matrix coating, preferably fully coating, the capsules with an additional shell. Thus, the resulting capsules may constitute an oil core being directly encased by the matrix formed in step e., which in turn is encased by a matrix, preferably of a different material, formed in step g, resulting in a multicoated capsule.

The matrix forming agent may comprise or be a polysaccharide. Typically, it may be a different polysaccharide then the matrix forming agent of step d. Suitable polysaccharides are selected from chitosan, cellulose, alginate, particularly sodium alginate, carrageenan, agar, agarose, pectins, gellan, starch, and the like. Preferred polysaccharides are alginate, preferably sodium alginate, chitosan, carrageenan and cellulose, more preferably alginate, preferably sodium alginate, chitosan. Preferably, the matrix forming agent of step d. may be sodium alginate and the matrix forming agent of step f. may be chitosan or microcrystalline carboxymethyl cellulose.

Typically, the pH adjustment constitutes an acidification, i.e. lowering the pH. For example, the pH may be lowered from 7 or more to 5 or less, preferably to pH 4-5.

In some embodiments, the capsules are coated by two or more additional layers. Thus, dip coating may be repeated with different matrix forming agents. Particularly, steps f. and g. may be repeated at least once, either with the same matrix forming agent or with different matrix forming agents, such as different polysaccharides or with pH protective coating such as Eudragit® or Eudraguard®.

In some embodiments, in particular after step e. or optionally after step g. the formed capsules are isolated, cured and/or preserved. Isolation of the capsules can for example comprise filtering or sieving in order to separate the capsules from the aqueous shell-forming solution, and optionally washing of the capsules with water optionally including a tenside, such as sodium laurylsulfate (SDS), a Tween derivative, such as Tween 20 or 80, or PVA. Curing may for example comprise drying of the capsules, for example by an air stream or by freeze drying, in order to evaporate all or at least the majority of the unbound water. Curing may also comprise further stirring of the capsules in an aqueous inorganic salt solution, such as a $CaCl_2$ or $MgCl_2$ solution, preferably a 1-10, more preferably 1 to 5 wt % aqueous solution of the inorganic salt. This further increases the stability and structural integrity of the capsules, in particular of the shell. Preserving may be achieved by immersing the capsules in distilled water or in an aqueous inorganic salt solution, such as a $CaCl_2$ or $MgCl_2$ solution, preferably a 1-10, more preferably 1 to 5 wt % aqueous solution of the inorganic salt. Such preserving has been found to increase bench stability of the capsules.

In some embodiments, in particular after step e. or optionally after step g. the capsules are exposed to a solution of a chelating agent in a solvent. The chelating agent is configured such that it can form a chelating complex with the gelation-inducing agent. For example, if the chelation inducing agent is a calcium salt, such a $CaCl_2$, the chelating agent can form a chelation complex with $Ca^{2+}$. Suitable chelating agents are Lewis bases, such as EDTA, GLDA (Tetrasodium N,N-Bis(carboxymethyl)-L-glutamate), MGDA (Trisodium dicarboxymethyl alaninate), citrate acid salts, tartaric acid salts and the like. The solvent typically selected such that the chelating agent is soluble therein and that the formed capsules, respectively the water insoluble matrix is not dissolved. Thus, a suitable solvent may be water. By exposing the capsules to such a solution for a predetermined duration, the capsule shell is weakened, as the chelating agent forms chelates with some of the gelation-inducing agent, respectively its derivatives. For example, if the gelation inducing agent is $CaCl_2$ and the chelation inducing agent is sodium citrate, calcium citrate forms, which weakens the shell of the formed capsules. The advantage is that the weakening of the shell and therefore the mechanical strength, can be accurately controlled. Weakening may be desired for products in which the shells shall break, respectively disintegrate, rather quickly, for example in cosmetic products, such as skin creams. As an example 0.001 to 0.4 wt %, particularly 0.01 to 0.1 wt %, of sodium citrate and optionally NaCl in 0.6 times the amount of sodium citrate may be dissolved in water. The capsules are stirred in this solution for 10 min to 50 min, in particular from 20 min to 40 min. The addition of NaCl has the effect that the softening effect is observed in a more homogenous manner from capsule to capsule and causes less capsule breakages.

In some embodiments, step c. is performed with, i.e. in, a device for generating a dispersion of a core-forming emulsion in a second aqueous solution, the device comprising a first inlet for supplying the core-forming emulsion of step a., which opens into the first chamber, a second inlet for supplying a second aqueous solution, opening into the second chamber and a dispersion outlet for collecting the dispersion. Furthermore, the device comprises a membrane, particularly a membrane as described above, which separates the first chamber and the second chamber and which comprises a first side facing the first chamber and a second side facing the second chamber. The membrane comprises multiple channels extending from the first side to the second side, i.e. providing a fluidic connection of the first chamber and the second chamber. Each channel comprises a channel inlet arranged on the first side and a channel outlet arranged on the second side. The first chamber may typically be configured such that a flow rate of the core-forming emulsion through all of the individual channels is essentially equal. In the state of the art, an inhomogeneous pressure distribution, in particular of the core-forming emulsion, enables only a small percentage of the channels to actively produce droplets. An equal pressure distribution over the first side however, allows for a steady flow of the core-forming emulsion into the second aqueous solution and for the generation of droplets with a reproducible quality with a high throughput of up to 5 liters per hour.

In certain embodiments, the second chamber may be made from glass or a transparent polymer, such as PTFE, polymethyl(meth)acrylate or polyoxymethylene, or from metals such as steel, aluminum or titanium. In general, the device may comprise a container, such as a glass container, which partially forms the second chamber. Together with the membrane, the container may form the second chamber. In some embodiments, the first chamber may be made from metal, for example aluminum or steel or from a transparent polymer, such as PTFE, polymethyl(meth)acrylate or polyoxymethylene.

The dispersion outlet may for example be in fluidic communication with the gelation vessel or the intermediate storage vessel.

In some embodiments, the first chamber is configured such that in an operative state, the pressure along the first side of the membrane is essentially isobaric. For example, the first inlet may comprise a nozzle for providing an isobaric pressure distribution over the first side of the membrane. In particular, a spray nozzle may be used. Alternatively, the first chamber may be shaped such that an isobaric pressure distribution over the first side of the membrane is provided.

In further embodiments, the first chamber has a rounded cross-section with respect to a cross-sectional plane, which is perpendicular to the membrane and rotationally symmetric with respect to a central longitudinal axis. The term "rounded cross-section" as used herein refers to a continuous curve without increments, particularly to a curve which has in the cross-sectional plane being perpendicular to the membrane, a radius of at least 1 mm, particularly at least 5 mm, particularly at least 10 mm. It is understood that the curvature in the cross-sectional view can be described as a part of a circle with said radius. Thus, the sidewalls of the first chamber may continuously converge towards each other in the upstream direction. The central longitudinal axis is an axis extending in the longitudinal direction of the device, which is arranged in the center of the device and/or to an axis being perpendicular to the membrane and intersecting the center of the membrane. For example, the first chamber may have a U-shaped cross-section or may be concavely rounded or semi-circular. The rounded cross-section is typically edgeless and thus excludes edges, which would lead to an uneven pressure distribution when the core-forming emulsion is forced through the membrane. Preferably, the first chamber may have the shape of a spherical dome. The shape of the first chamber may in general preferably be essentially rotationally symmetric to the central longitudinal axis.

In certain embodiments, the dispersion outlet may essentially be arranged on the central longitudinal axis and/or the axis being perpendicular to the membrane and intersecting the center of the membrane. Preferably, the second chamber is tapered towards the dispersion outlet. For example, at least parts of the second chamber may be arch- or cone-shaped towards the dispersion outlet. These embodiments ensure that no droplets are entrapped and all are directly collectable via the dispersion outlet.

In some embodiments, the first chamber has the shape of a hemisphere or of a truncated cone. Typically, the hemisphere or the truncated cone opens towards the membrane, that is, the largest radius is typically closest to the membrane. The term "hemispherical" as used herein also comprises other spherical segments, such as a third of a sphere. Thus, in some embodiments the shape of the first chamber is a spherical dome or spherical cap. Preferably, if the first chamber has a shape of a spherical dome, and/or particularly a hemispherical shape, the first inlet may be arranged adjacent to or in the region of a pole of the spherical dome of the first chamber, particularly of the hemispherical shaped first chamber. Such shapes have the advantage that the material flow of the core-forming emulsion is equally distributed over the first side of the membrane, thereby helping to provide an equal pressure distribution adjacent to individual channel. The first inlet may for example be arranged essentially perpendicular to the central longitudinal axis, i.e. essentially parallel to the first side of the membrane, or also parallel to the central longitudinal axis, i.e. perpendicular with respect to the first side of the membrane.

In some embodiments, the first inlet is arranged in an angle of essentially 90° or less with respect to the channels of the membrane. Typically, all channels are arranged essentially in parallel to each other. This has the beneficial effect that the core-forming emulsion is not directly forced onto the membrane, thereby further enabling to provide a uniform pressure distribution over each channel of the membrane. For example, the angle between the first inlet and the channels of the membrane may be between 60° and 90°, particularly 75° and 90°. Preferably, the first inlet is essentially transversely, preferably perpendicularly, arranged to the multiple channels of the membrane. Thus, in such embodiments, the first inlet may be parallel to the first side of the membrane.

In further embodiments the device comprises a membrane holder for mounting the membrane.

In certain embodiments, the device comprises a container holder for holding the container, which partially forms the second chamber. The container holder may be fixedly and releasably connected to the membrane holder. The container holder and/or the membrane holder and/or the basis may be made from any suitable material such as a plastic material, such as PTFE, polymethyl(meth)acrylate or polyoxymethylene or a metal, preferably steel.

Preferably, if the container is a glass container, a damping pad may be arranged between the glass container and the container holder for avoiding damaging and sealing the glass container.

In some embodiments the membrane holder comprises clamping means for mounting the membrane, the membrane holder and/or the clamping means being configured to accommodate membranes having various thicknesses. Typically, the clamping means may be adjustable. Examples for clamping means include screws, clamps, bolts, locks, etc.

In some embodiments, the device comprises a base, and preferably the first chamber is partially formed by the base.

In further embodiments the base and/or the membrane holder comprises at least one sealing to seal the membrane against the base and/or against the membrane holder. The sealing ring may be configured such that it circumferentially fully surrounds the periphery of the membrane. The sealing ring may also comprise a gas outlet in fluidic communication with the first chamber and being configured to vent any gas present in the first chamber out of the first chamber.

In some embodiments, the base and/or the membrane holder comprises a spacer ring. Such a spacer ring allows for employing differently thick membranes.

In some embodiments the first chamber comprises a gas outlet, particularly a fluidic switch such as e.g. a valve. The gas outlet and the membrane are arranged such that gas within the first chamber is during supplying the core-forming emulsion to the first chamber, in particular during the first/initial filling of the first chamber with the core-forming emulsion, directed towards the gas outlet and removed from the first chamber via the gas outlet. In some examples, the membrane is inclined with respect to the central longitudinal axis of the device. Thus, the angle in a cross sectional view along the central longitudinal axis between the central longitudinal axis and the first and/or second side of the membrane is different from For example, the acute angle between the second side of the membrane and the central longitudinal axis may be between 45° and 89°, preferably between 70° and 88°, more preferably between 78° and 87°. In such embodiments, the gas outlet may be arranged at the top edge of the first chamber, which is formed by the membrane and another chamber wall. This ensure that any residual gas, in particular air, being present in the first chamber, for example prior to using the device, rises to the membrane and due to the inclined arrangement of the membrane is directed to the top edge and thus to the gas outlet. Normally, the channels of the membrane are too narrow for air to pass through and therefore a gas outlet as described in the embodiments above enables to remove all remaining gas, which otherwise would negatively influence uniform droplet size and distribution or block the first fluid from reaching all the micro-channels, hence decreasing the throughput. Typically, the gas outlet may be in fluid communication with the environment of the device.

In some embodiments the device comprises at least one heater to heat the core-forming emulsion and/or the second aqueous solution and/or at least one cooler to cool the core-forming emulsion and/or the second aqueous solution. It may be beneficial to heat or cool either of the phases, as curing of the generated dispersed droplets may be readily effected by a temperature changes, for example by allowing the dispersion to cool. Typically, the at least one heater may provide enough thermal energy to heat the core-forming emulsion and/or the second aqueous solution up to 100° C., up to 125° C., or up to 150° C. The heater may for example comprise a heating bath, such as a water bath or an oil bath. Alternatively, the heater may be an IR-radiator, a heating coil, or any other suitable heater.

In further embodiments the device comprises a first reservoir for the core-forming emulsion and/or a second reservoir for the second aqueous solution. Both the first and second reservoir may be pressurized. For example, the reservoirs may be fluidic connected to a pressure source, such as a compressor.

Alternatively, the reservoirs may be syringes and pressurized by a common syringe pump and/or a plunger or a peristaltic pump, gear pump or any other pumping system.

In some embodiments, a flow restrictor is arranged between the second reservoir for the second aqueous solution and the second chamber. Such a restrictor is beneficial, as the second chamber typically does not provide a significant flow resistance for the second aqueous solution. Thus, by using a flow restrictor, the device is more stable, as unintentional pressure differences, for example by fluctuating air pressure, can be avoided.

In further embodiments, the second inlet comprises a supply channel being at least partially circumferentially arranged around the central longitudinal axis, respectively the axis being perpendicular to the first and second side of the membrane and intersecting the center of the membrane. The supply channel comprises one or more openings into the second chamber. At least partially circumferentially arranged around the above mentioned axis means that the supply channel may have the contour of, a partial circle, such as a semi-circle or a third of a circle, etc. Preferably, the supply channel is fully circumferentially arranged around the central longitudinal axis, respectively the axis being perpendicular to the membrane and intersecting the center of the membrane. In such embodiments, the supply channel forms a ring-like structure. Preferably, the supply channel comprises multiple openings into the second chamber, which in particular are essentially uniformly distributed along the circumference of the supply channel. Typically, the one or more openings of the supply channel may be arranged in the direction of the dispersion outlet, i.e., such that the openings are facing the dispersion outlet. Embodiments comprising a supply channel have the advantage that the second aqueous solution can be uniformly and smoothly introduced into the second chamber without causing detrimental turbulences which negatively influence the uniform shape and size distribution of the generated microdroplets. In some embodiments, the one or more openings of the supply channel are arranged such that a vortex is generated when the second aqueous solution is provided into the second chamber. Particularly, the one or more openings may be tubular and the longitudinal axis of each tubular opening can be inclined with respect to the central longitudinal axis of the device. Typically, all tubular openings are uniformly inclined. The generation of a vortex is beneficial as firstly, a surface stabilizer which may generally be comprised in the first and/or the second aqueous solution may be more evenly distributed, which will thus enhance the stability of the formed dispersion and secondly, because the transport of the generated dispersion towards the dispersion outlet is accelerated, which is particularly beneficial if the density of the first and second aqueous solution is essentially equal.

Typically, the supply channel is arranged at the bottom of the second chamber, i.e. adjacent to the membrane. The supply channel may for example also be arranged circumferentially around the membrane. The supply channel may have a diameter of 2 mm to 100 mm, preferably 5 mm to 20 mm.

Alternatively, the second inlet may constitute a single inlet opening directly into the second chamber, preferably from a lateral side of the second chamber.

In a second aspect the overall general objective technical problem is achieved by an assembly of capsules, particularly microcapsules, comprising a plurality of capsules produced according the method of any of the embodiments as described herein.

In some embodiments of the assembly of capsules the capsules have an equal size distribution with a coefficient of variation of 10% or less, particularly of 8% or less, particularly of 6% or less, particularly of 5% or less, particularly of 4% or less.

The skilled person understands that the coefficient of variation may be calculated by the ratio of the standard deviation $\sigma$ to the mean $\mu$, i.e., the average capsule size of the capsules of the assembly.

In some embodiments, the assembly of capsules comprises more than 50 capsules, particularly more than 100 capsules, particularly more than 500 capsules, particularly more than 1000 capsules, particularly more than 10,000 capsules, produced according to the method according to any of the embodiments described herein.

In some embodiments, each capsule of the assembly of capsules has a particle size of less than 4 mm, preferably between 1 μm and <4 mm, more preferably between 1 μm and <1 mm.

In some embodiments, the capsules of the assembly, in particular all capsules of the assembly, have a maximum difference of 1% with respect to a perfect sphere. In particular, the surface of the capsules has a maximum difference of 5% or even of maximum 1% with respect to a perfect sphere.

In some embodiments, the capsules of the assembly comprise a water insoluble matrix which breaks and/or melts at a temperature of at least 80° C., in particular of at least 90° C., preferably of between 80° C. and 100° C., preferably of between 70° C. and 90° C. Such embodiments, have the advantage that a compound of interest within the capsules is released at a specific, predetermined temperature. This is for example of particular interest for capsules being used as food additives. Such capsules may be completely odorless when they are intact, but break when they are cooked, such that the odor of interest is only liberated during cooking. In certain embodiments, the water insoluble matrix may consist of, or comprise, calcium carrageenan, calcium alginate potassium alginate, and/or potassium carrageenan.

In a third aspect, the overall general objective technical problem is achieved by a dispersion of microdroplets. The dispersion comprises an aqueous continuous phase and microdroplets of a dispersed phase. Typically, the dispersion may be formed by steps a. to c. of the method according to any of the embodiments of the first aspect of the invention. Each microdroplet of the dispersed phase is a micro-emulsion of an aqueous dispersed phase in an oil phase. Thus, the majority of material of each microdroplet is formed by the oil phase. Generally, the oil phase may constitute at least 50 wt %, or at least 60 wt % or at least 70 wt % of the core-forming emulsion. The aqueous dispersed phase of each microdroplet comprises water and a dissolved gelation-inducing agent. Furthermore, each microdroplet further comprises a first surfactant. The aqueous dispersed phase may typically be the aqueous dispersed phase provided in step a. of the method according to any of the embodiments of the first aspect of the invention. The dispersion of microdroplets further comprises a second surfactant.

In some embodiments, the oil phase comprises at least one compound of interest. The compound of interested may be selected from a protein, small molecule particularly a fragrant or flavor, active pharmaceutical ingredient such as cannabinoids, hemp extracts, caffeine, melatonin or hyaluronic acid; antibody, peptide, enzyme, RNA, DNA, vitamin and micro-organisms.

In some embodiments, the first surfactant is a nonionic surfactant, such as polyglycerol polyricinoleate (PGPR) or Span derivatives, such as Span 80 or Span 85, or a combination thereof. Furthermore, the first surfactant may be a solid particle, depending on the application preferably a hydrophobic hydrophilic or Janus-type particle, configured for providing a pickering emulsion. For example, the solid particle may be colloidal silica.

Preferably the first surfactant, particularly the non-ionic surfactant, has a molecular weight of between 600 and 120,000 g/mol, preferably between 800 and 80,000 g/mol.

Nonionic surfactants have been found suitable for providing sufficient stabilization for the microdroplets of the aqueous dispersed phase in the core-forming emulsion. PGPR has been found to be advantageous, as it stabilizes the core-forming emulsion sufficiently so that the microdisperse droplets of the aqueous dispersed phase do are not immediately destroyed, particularly during guiding the emulsion through the channels, but does also not stabilize the microdroplets too much, as this decreases the efficiency of the diffusion process of the gelation-inducing agent to the interface of the droplet in step e. such that it can react with the matrix forming agent.

In some embodiments, the amount of first surfactant in the core-forming emulsion is between 0.03 wt % and 0.15 wt %, preferably between 0.05 wt % and 0.10 wt %.

In some embodiments, the second surfactant has a molecular weight of between 600 and 120,000 g/mol, preferably between 800 and 80,000 g/mol.

Typically, the first surfactant and the second surfactant are different and thus not identical.

In some embodiments, the second surfactant is selected from polyvinylalcohol (PVA), a polysorbate, such as Tween 20 or Tween 80, saponins, sapogenins, i.e., quillaja extract, gum Arabic, beta lactoglobulin, sodium dodecyl sulfate, soy lecithin, potato protein (e.g. Solanic 300 Avebe®), sodium caesinate, potato protein isolate, whey protein isolate, starch octenyl succinate or a combination thereof. Preferably from polyvinylalcohol, a polysorbate, such as Tween 20 or Tween 80, beta lactoglobulin and starch octenyl succinate. With polyvinylalcohol, a polysorbate, such as Tween 20 or Tween 80, beta lactoglobulin and starch octenyl succinate a relatively thick and stable shell as compared to other second surfactants has been obtained. Polyvinylalcohol additionally provided an excellent monodispersity of the droplets of the core-forming emulsion in the second aqueous solution. Furthermore, the second surfactant may be a solid particle, depending on the application preferably a hydrophobic hydrophilic or Janus-type particle, configured for providing a pickering emulsion. For example, the solid particle may be colloidal silica.

In some embodiments, the gelation-inducing agent is an agent as disclosed with respect to the first aspect of the invention. In some embodiments, the gelation-inducing agent is thus an inorganic salt as disclosed with respect to the first aspect of the invention, particularly an alkaline earth metal salt, particularly an alkaline earth metal halide, an alkaline earth metal pseudohalide, an alkaline earth metal carboxylate or an alkaline earth metal nitrate.

In a fourth aspect, the invention comprises a device for producing capsules with a matrix shell encasing an oil core, the device comprising:

a. A first inlet (2) for supplying a core-forming emulsion of an aqueous dispersed phase in an oil phase, the aqueous dispersed phase comprising water and a dissolved gelation-inducing agent, the emulsion further comprising a first surfactant, the first inlet (2) opening into a first chamber (4);
b. A second inlet (3) for supplying a second aqueous solution, the aqueous solution comprising water and a second surfactant, the second inlet (3) opening into a second chamber (5);
c. A dispersion outlet (6) for collecting the dispersion or microdroplets from the second chamber (5);
d. One or more channels (10), preferably micro-channels, wherein the one or more channels (10) fluidic connect the first chamber (4) with the second chamber (5);
e. A gelation vessel (105), preferably being fluidic connected to the dispersion outlet (6), the gelation vessel comprising an aqueous shell-forming solution, the aqueous shell-forming solution comprising water and a water soluble matrix-forming agent.

It is understood that the device of the fourth aspect of the invention can also comprise the embodiments for the device described with respect to the first aspect of the invention, i.e. the device which can be used in the method according to the first aspect of the invention.

In some embodiments, the device may comprise a mixing vessel, preferably comprising a stirrer, for mixing a core-forming emulsion of an aqueous dispersed phase in an oil phase, the aqueous dispersed phase comprising water and a dissolved gelation-inducing agent, the emulsion further comprising a first surfactant. The mixing vessel may be fluidic connected to the first inlet opening into the first chamber of the device. Preferably, the mixing vessel comprises at least an oil phase and optionally already the core-forming emulsion of the aqueous dispersed phase in the oil phase.

In a fifth aspect, the overall objective technical problem is solved by a capsule generated by any of the embodiments of the method of the first aspect of the invention.

In a sixth aspect, the general object is achieved by a method for generating capsules with a matrix shell encasing an oil core, the method comprising the steps:

a. Providing in a first chamber a core-forming emulsion of an aqueous dispersed phase in an oil phase, the aqueous dispersed phase comprising water and a dissolved matrix-forming agent, the emulsion further comprising a first surfactant;
b. Providing in a second chamber a second aqueous solution, the aqueous solution comprising water and a second surfactant.

The first chamber and the second chamber are fluidic connected by one or more channels, preferably by micro-channels. The method further comprises the steps c. Guiding the core-forming emulsion of step a. from the first chamber through the one or more channels into the second chamber to form a dispersion of the core-forming emulsion of step a. in the second aqueous solution of step b.;

d. Mixing the dispersion formed in step c. with an aqueous shell-forming solution, the aqueous shell-forming solution comprising water and a water soluble gelation-inducing agent.

The gelation-inducing agent and the matrix-forming agent are configured such that they are capable of undergoing a chemical reaction with each other to form a water insoluble matrix shell. The method further comprises the step e. Reacting the gelation-inducing agent and the matrix-forming agent in the dispersion formed in step c. to form capsules of a water insoluble matrix shell encasing an oil core.

It is understood that the method according the sixth aspect of the invention can also comprise the embodiments described with respect to the first aspect of the invention.

BRIEF DESCRIPTION OF THE DRAWINGS

The herein described invention will be more fully understood from the detailed description given herein below and the accompanying drawings which should not be considered limiting to the invention described in the appended claims. The drawings are showing:

DESCRIPTION

Figures 1A, 1B, 1C:
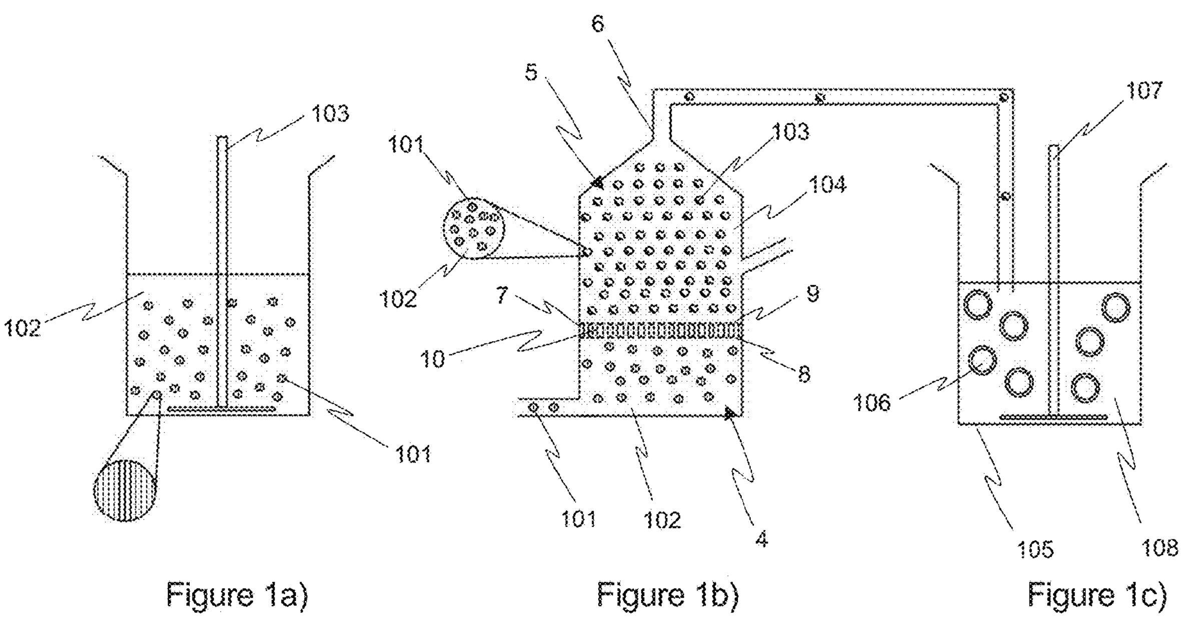
FIGS. 1*a*)-*c*) a schematic representation of the method according to the invention.

FIGS. 1*a*)-*c*) illustrates schematically the method according to an embodiment of the invention. In a first step, a core forming emulsion is generated by mixing a solution 101 comprising a gelation inducing agent and water with oil phase 102 (FIG. 1*a*)). This may for example be done with stirrer 103. FIG. 1*a*)) also shows an enlarged view of a droplet of solution 101 in the emulsion. The straight lines of the droplets represent droplets comprising water and dissolved therein the gelation inducing agent, for example an inorganic salt $A^{+}B^{-}$. Thus every droplet shown in FIG. 1*a*)) is an aqueous solution of the gelation inducing-agent. The formed emulsion of the aqueous solution 101 of the gelation-inducing agent in oil phase 102 is then provided into first chamber 4 of a suitable device (FIG. 1*b*)). Second chamber 5 of the device comprises second aqueous solution 104 comprising water and a first surfactant. As can be seen, first chamber 4 and second chamber 5 are fluidic connected by multiple channels 10. In the embodiment shown, the first chamber and the second chamber are separated by membrane 7 whose first side 8 faces towards the first chamber and whose second side 9 faces towards the second chamber. Channels 10 extend from the first side 8 towards the second side 9. In general, a suitable pressure is applied on core-forming emulsion in first chamber 4. The emulsion in first chamber 4 is then guided through channels 10. As the emulsion generally comprises as the major component the oil phase 102, a step emulsification takes place as the emulsion reaches the channel outlet opening into second chamber 5, thereby forming a dispersion of the core forming emulsion, i.e., monodisperse droplets 103 in second aqueous phase 104. It should be noted that the sizes of the droplets are exaggerated for clarity purposes. Furthermore, the relative size of droplets 101 with respect to droplets 103 and/or 106 does not resemble the reality. Each monodisperse droplet 103 in second chamber 5 now comprises one or more droplets 101 being dispersed in oil phase 102, as it illustrated in the enlarged view of a droplet. Thus the dispersion in second chamber may be considered as a "water in oil in water emulsion (W/O/W emulsion)". This dispersion is then mixed with an aqueous shell forming solution 108 comprising water and a water soluble and dissolved matrix-forming agent. Aqueous shell-forming solution 108 is contained in gelation vessel 105, being equipped with stirrer 107. When the dispersion of the core forming emulsion, i.e., monodisperse droplets 103 in second aqueous phase 104 is mixed with the aqueous shell forming solution 108, the gelation-inducing agent within droplets 103 diffuses towards the droplet surface and then chemically reacts at the interface with the matrix-forming agent to form a water insoluble matrix shell, which fully grows around each droplet thereby forming capsules 106 of a water insoluble matrix shell encasing an oil core.

Figure 2:
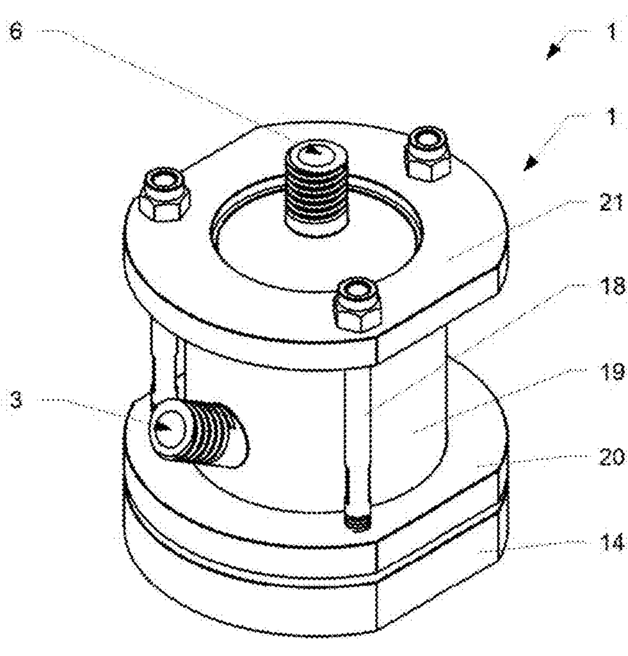
FIG. 2 a schematic view of a device for generating a dispersion of a core-forming emulsion in a second aqueous solution according to a first embodiment of the invention.

FIG. 2 depicts device 1 which can be used in a method according to the invention, particularly for generating a dispersion of the core-forming emulsion in the second aqueous solution. Device 1 comprises a container 19, which is made from glass and base 14 being made from metal. Base 14 comprises a first inlet (not shown, see FIG. 2) for supplying a core-forming emulsion, opening into a first chamber. The first chamber may be partly formed by base 14 and membrane 7 (see FIG. 3). Container 19 comprises second inlet 3 for supplying the second aqueous solution 104, opening into a second chamber and dispersion outlet 6 for collecting the dispersion generated within the second chamber. The second chamber is being formed by container 19 and membrane 7 (see FIG. 3). Device 1 further comprises membrane holding structure 20 being fixedly connected to base 14. Furthermore, the device contains container holding structure 21, which is fixedly connected via clamping means 18 to membrane holding structure 20. As a result, container 19 is fixedly connected to base 14.

Figure 3:
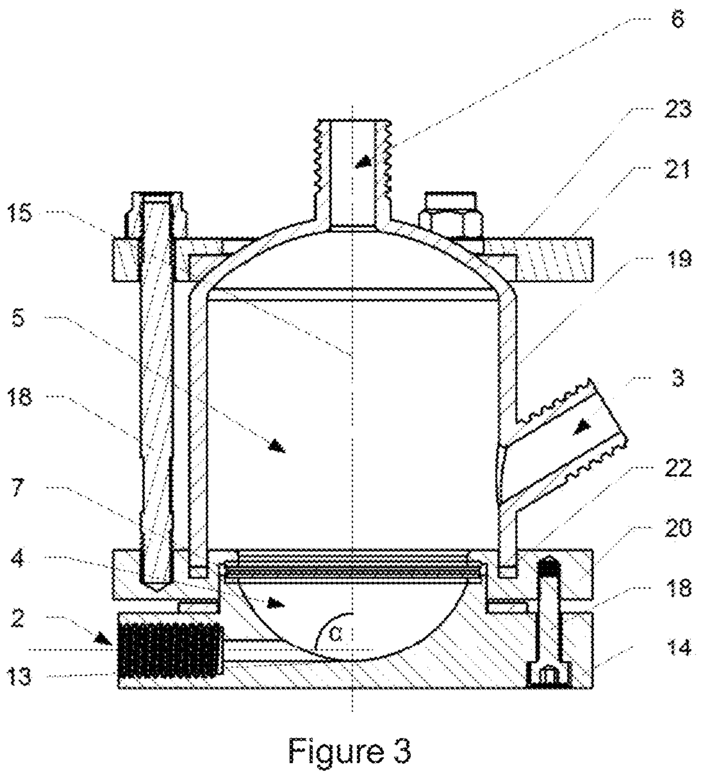
FIG. 3 a cross-sectional view of the device shown in FIG. 2.

FIG. 3 shows a cross-sectional view of device 1 of FIG. 2. Device 1 comprises base 14 with first inlet 2 for supplying the core-forming emulsion. Inlet 2 opens into first chamber 4, which is partially formed by base 14. Device 1 further contains container 19 with second inlet 3 for supplying the second aqueous solution 104 and dispersion outlet 6 for collecting the dispersion of the core-forming emulsion in the second aqueous solution. Second inlet 3 opens into second chamber 5, which is partially formed by container 19. The first chamber and the second chamber are being separated by membrane 7. As can be readily seen from FIG. 2, the first chamber has a rounded cross-section with respect to the corresponding cross-sectional plane along the central longitudinal axis 15 and being perpendicular to membrane 7. In the particular embodiment shown, first chamber 4 has a semi-circular cross-section and may thus have the shape of a hemisphere. First inlet 2 is arranged in the region of pole 13 of the hemisphere. Second chamber 5 is tapered towards dispersion outlet 6, which is arranged on longitudinal axis 15 extending along the longitudinal direction of the device, intersecting the center of the first and second chamber, being perpendicular to membrane 7 and intersecting the center of the membrane. As can be seen, longitudinal axis ..constitutes a central axis of the device in the longitudinal direction. In the embodiment shown, the second chamber is arch-shaped towards dispersion outlet 6. Thus, second chamber 6 has a U-shaped cross-section. First inlet 2 is arranged in an angle $\alpha$ of essentially 90° with respect to central axis 15 and the channels of the membrane, which are in general parallel to axis 15. Device 1 comprises membrane holder 20 and container holder 21, which are fixedly connected with each other via releasable clamping means 18. Membrane 7 is mounted to membrane holder 20 by clamping the membrane between membrane holder 7 and base 14. Membrane holder 20 is fixedly connected to base 14 via clamping means 18. For safely securing glass container 19 between membrane holder 20 and container holder 21, pad 23, which in the particular case is a foam pad, can be arranged between container 19 and container holder 21. Membrane holder 20 comprises groove 22, for receiving container 19.

Figure 4:
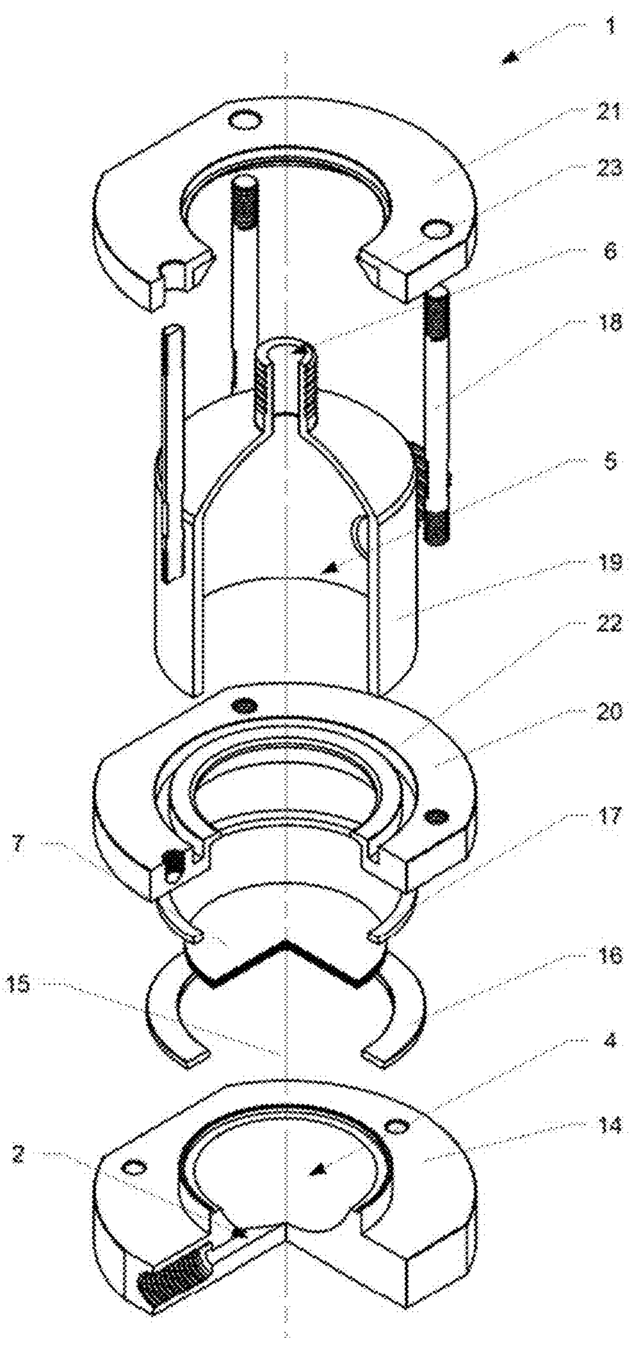
FIG. 4 an exploded partially cut-out view of the device shown in FIG. 2.

FIG. 4 shows an exploded view of partially cut device 1 of FIG. 2. As can be seen, the first chamber is partially formed by base 14 and has the shape of a hemisphere. First inlet 2, which is arranged in an angle of essentially 90° to central axis 15, is arranged on the pole of the hemisphere. Base 14 comprises spacer ring 16 which enables the use of different membranes with different thicknesses and membrane holder comprises sealing ring 17. Membrane 7 is arranged between rings 16 and 17. The design of device with adjustable clamping means 18 allows to employ membranes of various thicknesses. Membrane holder 20 further comprises circumferential groove 22 for receiving the lower end portion of container 19. Clamping means 18 fixedly and releasably connect membrane holder 20 with container holder 21.

Figure 5:
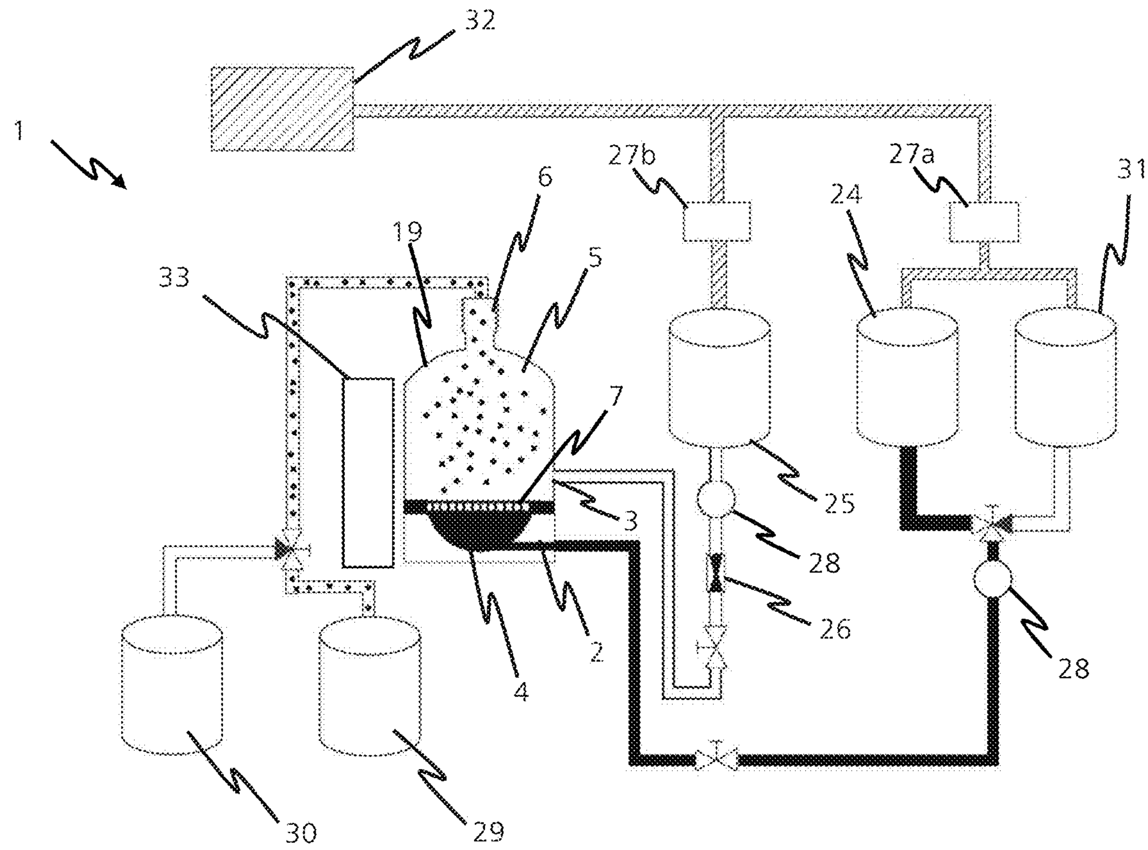
FIG. 5 a schematic view of a device according to another embodiment of the invention.

FIG. 5 shows a schematic view of a device 1 which may be used according to a preferred embodiment of the invention. Second chamber 5 is formed by container 19 and membrane 7 which separates first chamber 4 from second chamber 5. Container 19 comprises dispersion outlet 6, which is in fluid connection with product vessel 29 and waste vessel 30. In general, the fluid flow may be controlled by a valve, such as a three-way valve. Device 1 further comprises first reservoir 24 which is in fluid communication with first chamber 4 which may either only server as a reservoir for providing the core-forming emulsion into first chamber 4 via first inlet 2 or which can also serve as the mixing vessel for preparing the core-forming emulsion. Arranged between first reservoir 24 and first inlet 2 is a flow meter for measuring the fluid flow of the core-forming emulsion. First reservoir 24 is in fluid connection with pressure source 32. Furthermore, pressure regulator **27*a* is arranged between first reservoir 24 and pressure source 32. In addition to first reservoir 24, device 1 comprises rinsing reservoir 31 which is also in fluid communication with both first chamber 4 and pressure source 32. Rinsing reservoir 31 is configured for providing a rinsing solution into first chamber 4 for cleaning device 1 after its intended use. In general, if a rinsing solution is provided to first chamber 4, the three-way valve arranged between product vessel 29 and waste vessel 30 and dispersion outlet 6 is configured such that the rinsing solution can flow into waste vessel 30. The product vessel 29 may for example serve directly as the gelation vessel. Alternatively, it can serve as an intermediate storage vessel, before the formed dispersion is mixed with the aqueous shell-forming solution. Device 1 further comprises heater 33 configured for heating the first and second chamber during the production of a dispersed phase. Furthermore, second chamber 5 is in fluid communication with second reservoir 25 for supplying second chamber 5 with the second aqueous solution. Flow restrictor 26 and flow meter 28 are arranged between second chamber 5 and second reservoir 25. In the embodiment shown, flow restrictor 26 is arranged behind flow meter 28 in the direction of flow. Second reservoir 25 is further in fluidic connection with pressure source 32. Additionally, a second pressure regulator 27*b* is arranged between second reservoir 25 and pressure regulator 27*a***.

Figure 6:
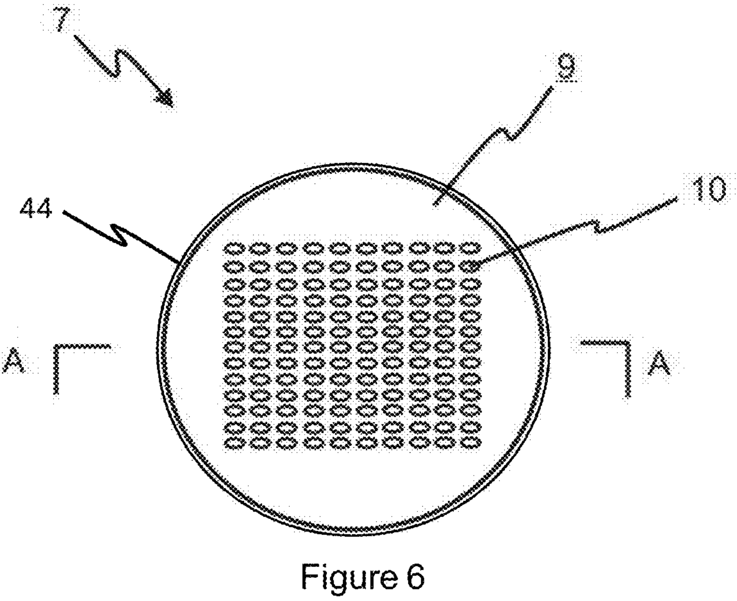
FIG. 6 a schematic enlarged view of a second side of a membrane according to an embodiment of the invention.

FIG. 6 shows a monolayer membrane 7 for generating a dispersion of a core-forming emulsion in a second aqueous solution, which can be used in a method and/or a device as described in any of the embodiments disclosed herein. Membrane 7 has a first side 8 (not shown) and second side 9, which in an operative state faces a second chamber. Multiple micro-channels 10 extend through membrane 7. Each channel 10 has an elliptical contour. In addition, membrane 7 comprises membrane sealing ring 44, which circumferentially fully surrounds the periphery of the membrane.

Figure 7:
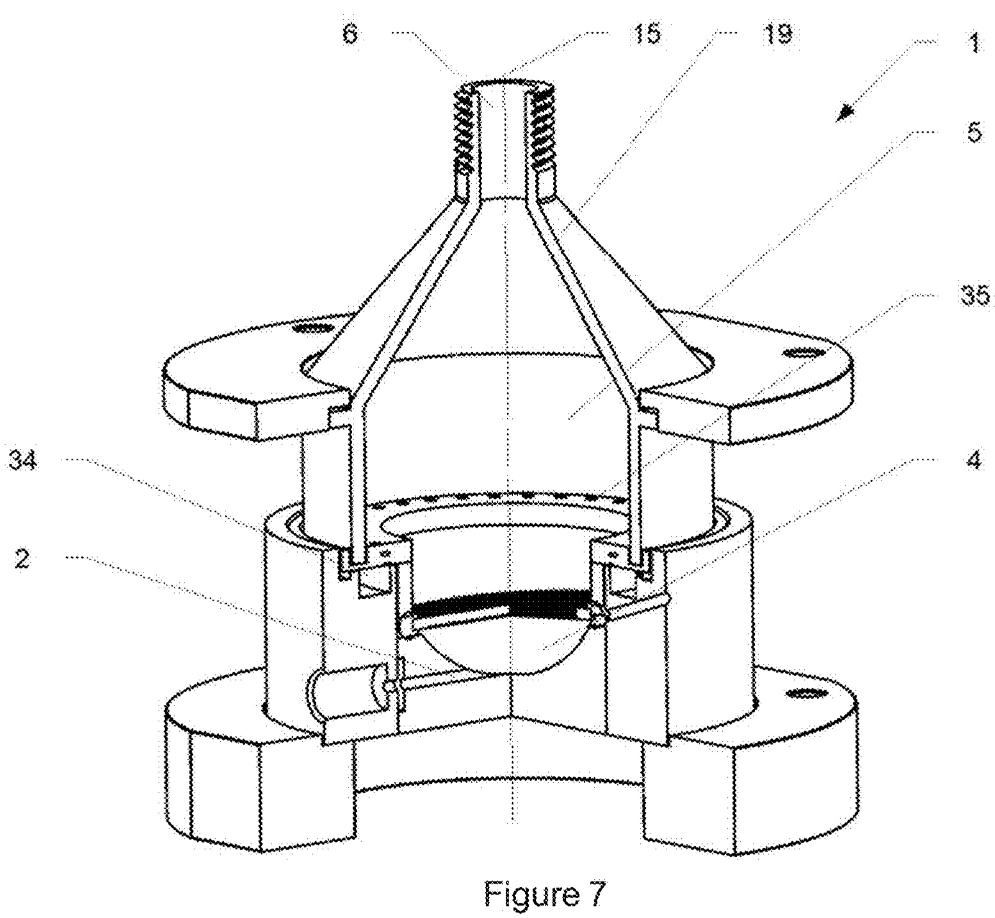
FIG. 7 a partial cross-sectional of a device according to another embodiment of the invention.

FIG. 7 shows a partial cross-sectional view of a device which can be used in embodiment of the invention. The device 1 has a first inlet 2 for supplying a core-forming emulsion, which opens into first chamber 4 having a rounded cross-section. In the embodiment shown, first chamber 4 has the shape of a spherical dome with a radius at the base of the dome being smaller than the radius of the corresponding hypothetical full sphere. Second chamber 5 is at least partially defined by container 19. The device further comprises dispersion outlet 6 for collecting the generated dispersion of the core-forming emulsion in the second aqueous solution. The corresponding membrane is not shown for better visualization. The second inlet opening towards the second chamber 5 comprises in the depicted embodiment a supply channel 34 being circumferentially arranged around central longitudinal axis 15 and/or the axis being perpendicular to the first and second side of the membrane and intersecting the center of the membrane. The supply channel 34 comprising a plurality of openings 35 into second chamber 5. Openings 35 are uniformly distributed along the circumference of the supply channel and are arranged in the direction of dispersion outlet 7. In the embodiment shown, supply channel 34 forms a ring-like structure, being arranged at the bottom of second chamber 5, i.e. at the edge of the membrane and container 19. In the embodiment shown, the supply channel has an angular cross-section. Alternatively, the supply channel may have a rounded, particularly a circular cross-section.

Figure 8:
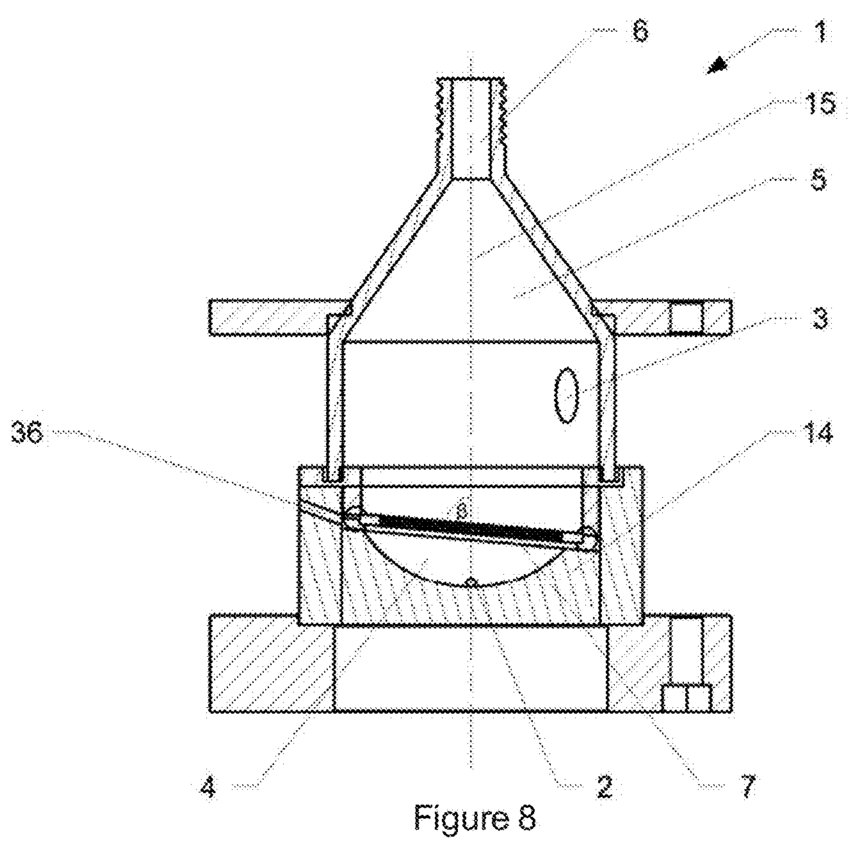
FIG. 8 a cross-sectional of a device according to another embodiment of the invention.

FIG. 8 shows a cross-sectional view of another embodiment of the device shown in FIG. 7. The device 1 has a first inlet 2 for supplying a core-forming emulsion, which opens into first chamber 4 having a rounded cross-section. In the embodiment shown, first chamber 4 has the shape of a spherical dome. A membrane 7 separates first chamber 4 from second chamber 5. In contrast to the embodiment shown in FIG. 2, the membrane is inclined with respect to the central longitudinal axis 15 of the device 1. The acute angle β in a cross sectional view along the central longitudinal axis between the central longitudinal axis and the second side of the membrane is between 45° and 89°, preferably between 70° and 88°, more preferably between 78° and 87°. The device 1 comprises additionally gas outlet 36. The gas outlet and the membrane are arranged such that gas within the first chamber is during supplying the core-forming emulsion to the first chamber, in particular during the first filling, directed towards the gas outlet and removed from first chamber 4 via the gas outlet 36. As can be seen, gas outlet 36 is arranged at the top edge of first chamber 4, which is formed by the membrane 7 and the chamber wall, which is part of the base 14. Before the initial filling of first chamber 4 with the core-forming emulsion, gas, particularly air, is present in the first chamber. Upon filling of first chamber 4 with the core-forming emulsion, air is pushed out of gas outlet 36. Due to the arrangement of membrane 7 and gas outlet 36, essentially all gas can be removed from first chamber 4. As remaining gas, in particular gas bubbles have detrimental effects on pressure distribution, size and particle distribution becomes more uniform.

Figure 9:
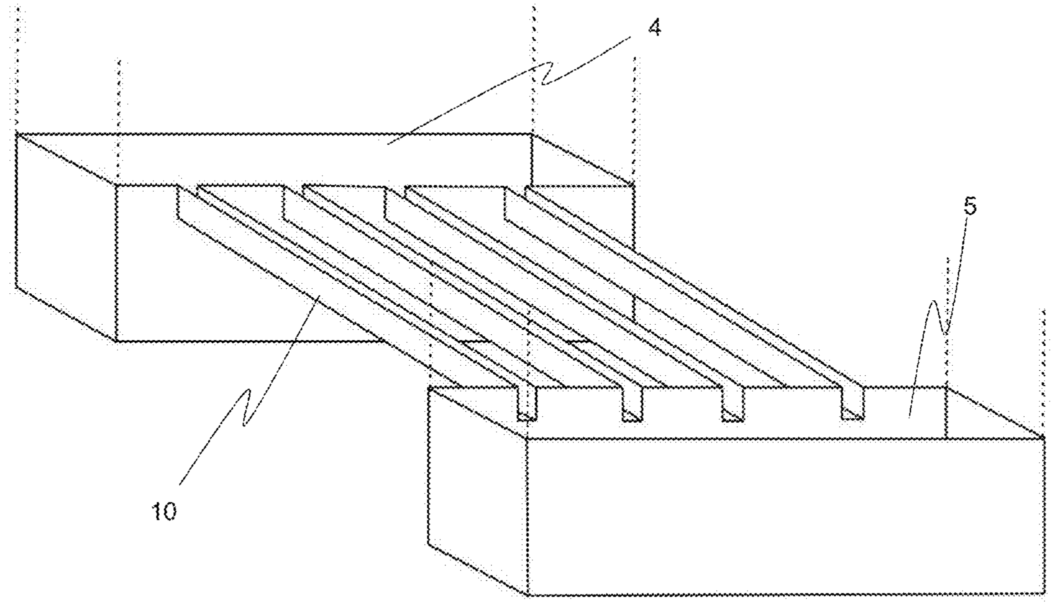
FIG. 9 shows another device which can be used in the method according to an embodiment of the invention.

FIG. 9 shows a sectional view of another device which can be used in the method according to the invention (cf. FIG. 1*b*)). The device comprises first chamber 4 being in fluidic connection via micro-channels 10 with second chamber 5. Thus, the in the first chamber can be provided a core-forming emulsion of an aqueous dispersed phase in an oil phase, the aqueous dispersed phase comprising water and a dissolved gelation-inducing agent, the emulsion further comprising a first surfactant. This emulsion is then guided via micro-channels 10 from the first chamber into the second chamber 5, which contains a second aqueous solution, the aqueous solution comprising water and a second surfactant. From there, the emulsion is then transported into a gelation vessel containing the aqueous shell-forming solution (not shown).

EXAMPLES

Figure 10A:
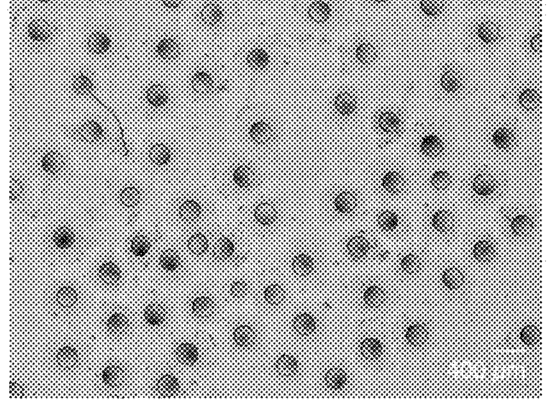
FIGS. 10*a* and 10*b* show microscopic images of capsules generated by the method according to the invention.
Figure 10A:
Figure 10B:
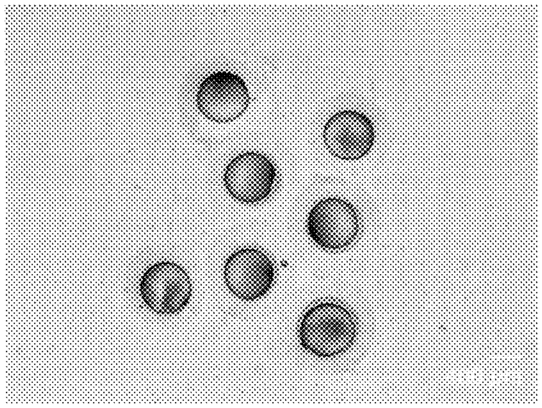

FIG. 10*a* shows a microscopic image of capsules produced by the method according to the invention with a uniform size distribution with an average core diameter of 270 μm. FIG. 10*b* shows a microscopic image of capsules produced by the method according to the invention with a uniform size distribution with an average core diameter of 550 μm.

Figure 11:
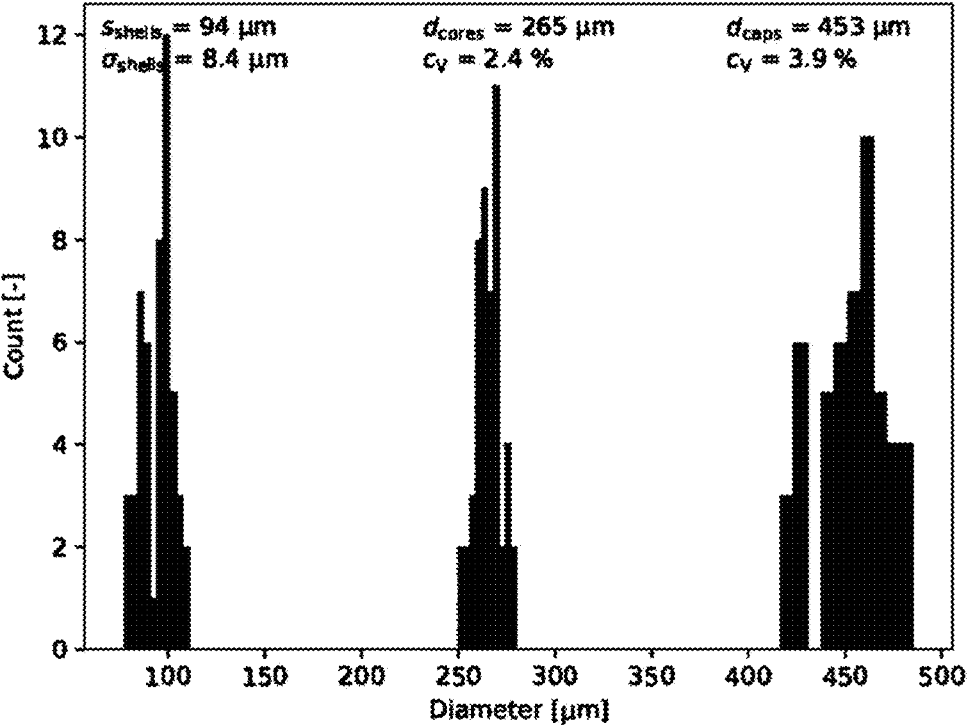
FIG. 11 shows the size distribution of an assembly of capsules according to an embodiment of the invention.

FIG. 11 shows the size distribution of an assembly of alginate capsules having an MCT oil core according to an embodiment of the invention. The size distribution on the left shows the distribution of the shell thickness over the capsules. The average shell thickness of the capsules of the assembly is 94 μm. The center graph shows the average diameter of the oil core of each of the capsules of 265 μm and a coefficient of variation of 2.4%. The graph on the right shows the total size distribution of the capsules of the assembly, i.e. twice the shell thickness and the oil core diameter. The average particle size of the capsules is 453 μm with a coefficient of variation of 3.9%.

Figures 12, 13:
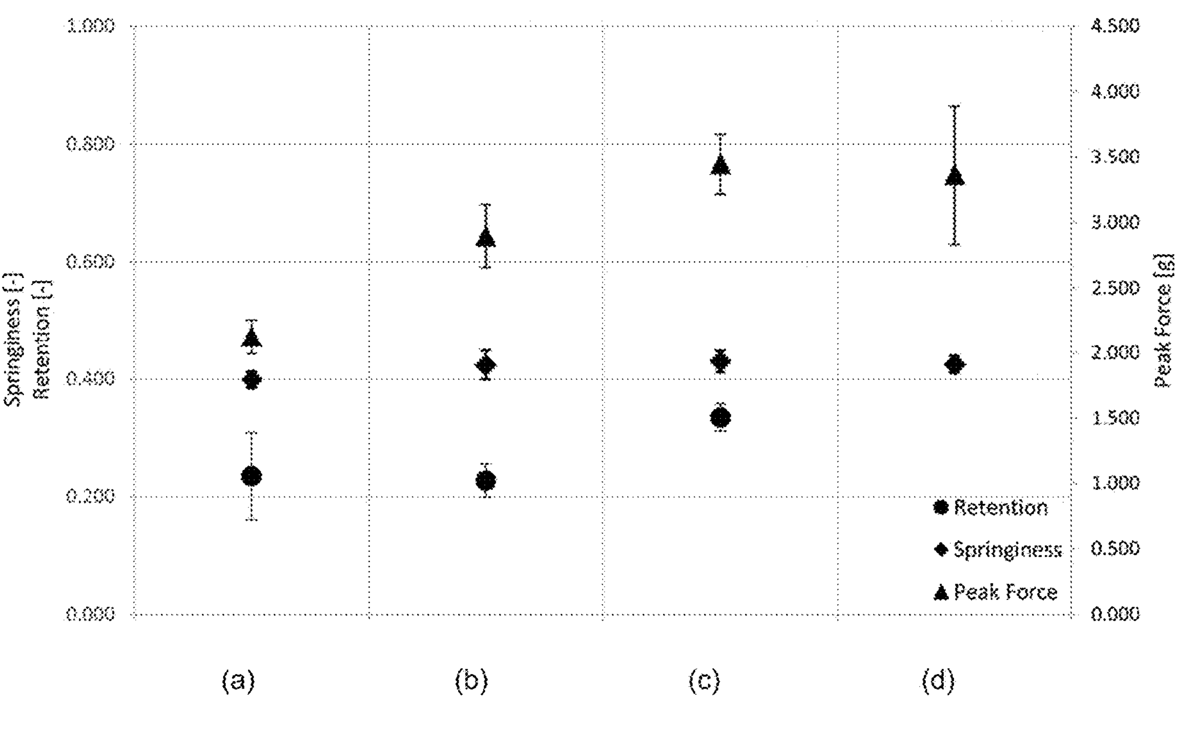
FIG. 12 shows a comparison of mechanical properties of capsule in which solid starch particles have been added to the aqueous shell-forming solution and capsules without such particles.
FIG. 13 shows a comparison of mechanical properties of capsule in which pectin has been added to the aqueous shell-forming solution and capsules without such addition.

FIG. 12 shows the measured springiness (♦), retention (●) and peak force (▲) of (a) capsules which have been prepared using an aqueous shell-forming solution in step d. comprising only 1 wt % Na-alginate providing for a shell consisting essentially of calcium alginate; (b) capsules which have been prepared using an aqueous shell-forming solution in step d. comprising 1 wt % Na-alginate and 5 wt % corn starch solid particles with a particle size of equal or less than 15 μm; (c) capsules which have been prepared using an aqueous shell-forming solution in step d. comprising 1 wt % Na-alginate and 5 wt % corn starch solid particles with a particle size of equal or less than 15 μm, wherein tempering of the capsules has been performed at 75° C.; (d) capsules according to (c) after 28 days. As can be seen, employing an additional biopolymer, such as starch provides a significant increase compared to using solely an alginate as the shell forming agent (compare (a) and (b)). Furthermore, heating the capsules provides additional mechanical strength, as the employed starch generates itself a more pronounced network (compare (a)/(b) and (c)). In addition, the observed effect is stable overtime, as evidenced by (d).

For measuring these parameters, capsules are compressed to 25% strain with constant compression speed of 0.5 mm/s (Point 1 to Point 2) followed by returning to the starting position with same constant retraction speed of 0.5 mm/s (Point 2 to Point 3) with a compressing element having a flat geometry with a diameter larger than the particle. The springiness (i.e. elasticity of the capsule) is the ratio of area under the force distance curve of retraction and compression (2 to 3 and 1 to 2). The peak force is equivalent to the maximum force at 25% strain (Point 2).

For measuring the energy retained, the capsules are compressed to 25% strain with a compressing element having a flat geometry with a diameter larger than the particle with a constant compression speed of 0.5 mm/s. This position is held for 15 seconds, before the compressing element is retracted with a speed of >0.5 mm/s. The energy retained, i.e. the retention, is the ratio between force at the end and the beginning of 25% Strain compression.

FIG. 13 shows the measured springiness (♦), retention (■) and peak force (▲) of (a) capsules which have been prepared using an aqueous shell-forming solution in step d. comprising only 1 wt % Na-alginate providing for a shell consisting essentially of calcium alginate; (b) capsules which have been prepared using an aqueous shell-forming solution in step d. comprising 0.67 wt % Na-alginate and 1.33 wt % pectin; (c) capsules which have been prepared using an aqueous shell-forming solution in step d. comprising 0.67 wt % Na-alginate and 1.33 wt % pectin, wherein the capsules have additionally been coated with chitosan by immersing in an aqueous chitosan solution (2 wt %) for 10 min to 30 min; (d) capsules which have been prepared using an aqueous shell-forming solution in step d. comprising 0.67 wt % Na-alginate and 1.33 wt % pectin, wherein the capsules have additionally been coated with chitosan by immersing in an aqueous chitosan solution (2 wt %) for 10 min to 30 min and wherein tempering of the capsules has been performed at 90° C.

The following table illustrates suitable recipes which can be used in the method according to the invention:

TABLE 1

| Generation of the core forming emulsion of an aqueous dispersed phase in an oil phase | |
|---|---|
| Component | Concentration (wt %) |
| Water | 20-30 |
| $CaCl_2$ | 2-5 |
| PGPR | 0.03-0.15 |
| Sunflower oil | 64.85-77.97 |

TABLE 2

| Generation of the aqueous shell-forming solution resulting in capsules with >270 μm core size | |
|---|---|
| Component | Concentration (wt %) |
| Sodium Alginate | 0.1-2 |
| Ethanol | 10-20 |
| Water | 78-89.9 |

TABLE 3

| Generation of the aqueous shell-forming solution resulting in capsules with <270 μm core size | |
|---|---|
| Component | Concentration (wt %) |
| Sodium Alginate | 0.1-2 |
| Ethanol | 21-30 |
| Water | 68-78.9 |

The second aqueous phase is a 1 wt % solution of PVA in water.

The invention claimed is:

1. A method for generating capsules with a matrix shell encasing an oil core, the method comprising the steps:

a. providing in a first chamber a core-forming emulsion comprising an aqueous dispersed phase in an oil phase, the aqueous dispersed phase comprising water and a gelation-inducing agent, the emulsion further comprising a first surfactant;

b. providing in a second chamber a second aqueous solution, the aqueous solution comprising water and a second surfactant, wherein the first chamber and the second chamber are fluidically connected by a plurality of channels;

c. guiding the core-forming emulsion of step a from the first chamber through the plurality of channels into the second chamber to form a dispersion of the core-forming emulsion of step a in the second aqueous solution of step b;

d. mixing the dispersion formed in step c with an aqueous shell-forming solution, the aqueous shell-forming solution comprising water and a water soluble matrix-forming agent; and e. reacting the gelation-inducing agent and the matrix-forming agent in the dispersion formed in step c to form capsules of a water insoluble matrix shell encasing an oil core, wherein the gelation-inducing agent and the matrix-forming agent are configured such that they are capable of undergoing a chemical reaction with each other to form the water insoluble matrix shell.

2. The method according to claim 1, wherein the oil phase in step a further comprises at least one compound of interest.

3. The method according to claim 1, wherein step a comprises substeps a1 dissolving the gelation-inducing agent in water to form a solution and a2 mixing the formed solution with the oil phase and with the first surfactant.

4. The method according to claim 1, wherein after step c, the dispersion formed in step c is delivered to a gelation vessel containing the aqueous shell-forming solution of step d.

5. The method according to claim 4, further comprising stirring the delivered dispersion of the core-forming emulsion of step a in the aqueous solution of step b and the aqueous shell-forming solution within the gelation vessel.

6. The method according to claim 1, wherein the first surfactant comprises a nonionic surfactant.

7. The method according to claim 1, wherein the second surfactant is selected from polyvinylalcohol (PVA), a polysorbate, saponins, sapogenins, gum Arabic, beta lactoglobulin, sodium dodecyl sulfate, soy lecithin, sodium caseinate, potato protein isolate, whey protein isolate, and/or starch octenyl succinate.

8. The method according to claim 1, wherein the matrix-forming agent comprises a polysaccharide or a salt thereof.

9. The method according to claim 1, wherein the gelation-inducing agent comprises an inorganic salt.

10. The method according to claim 1, wherein an osmosis regulator is added to the aqueous shell-forming solution prior to step d.

11. The method according to claim 1, wherein a pressure of 1.01 bar to 1.15 bar is applied to the first chamber and/or wherein a pressure of 1.02 bar to 1.2 bar is applied to the second chamber.

12. The method according to claim 11, wherein the pressure applied to the first chamber is smaller than the pressure applied to the second chamber.

13. The method according to claim 1, wherein mixing in step d is performed with a stirrer stirring at 10 rpm to 800 rpm.

14. The method according to claim 13, wherein the aqueous shell-forming solution is stirred with a stirrer at 500 rpm to 800 rpm prior to step d and wherein during step d is stirred at 50 rpm to 150 rpm.

15. The method according to claim 1, wherein step e is performed for 5 min to 25 min.

16. The method according to claim 1, wherein after step e the capsules are coated with an additional layer by dip coating.

17. The method according to claim 16, wherein the capsules are coated with two or more additional layers.

18. The method according to claim 1, wherein after step e the formed capsules are isolated, cured and/or preserved.

19. An assembly of capsules comprising a plurality of capsules produced according to the method according to claim 1.

20. The assembly of capsules according to claim 19, wherein the capsules have an equal size distribution with a coefficient of variation of 10% or less.

21. A dispersion of microdroplets, the dispersion comprising an aqueous continuous phase and microdroplets of a dispersed phase;

wherein each microdroplet of the dispersed phase comprises a micro-emulsion of an aqueous dispersed phase in an oil phase, wherein the aqueous dispersed phase comprises water and a dissolved gelation-inducing agent, wherein each microdroplet further comprises a first surfactant; and wherein the dispersion of microdroplets further comprises a second surfactant.

22. The dispersion according to claim 21, wherein the oil phase comprises at least one compound of interest.

23. The dispersion of claim 21, wherein the first surfactant comprises a nonionic surfactant, and/or wherein the second surfactant is selected from polyvinylalcohol (PVA), a polysorbate, saponins, sapogenins, gum Arabic, beta lactoglobulin, sodium dodecyl sulfate, soy lecithin, sodium caseinate, potato protein isolate, whey protein isolate, and/or starch octenyl succinate.

24. The dispersion according to claim 21, wherein the gelation-inducing agent comprises an inorganic salt.

25. A device for producing capsules with a matrix shell encasing an oil core, the device comprising:

a. a first inlet for supplying a core-forming emulsion of an aqueous dispersed phase in an oil phase, the aqueous dispersed phase comprising water and a dissolved gelation-inducing agent, the emulsion further comprising a first surfactant, the first inlet opening into a first chamber;

b. a second inlet for supplying a second aqueous solution, the aqueous solution comprising water and a second surfactant, the second inlet opening into a second chamber;

c. a plurality of channels, wherein the plurality of channels fluidically connect the first chamber with the second chamber to permit passage of the core-forming emulsion into the second chamber for mixing with the second aqueous solution;

d. a dispersion outlet for collecting a dispersion of microdroplets from the second chamber; and e. a gelation vessel fluidically connected to the dispersion outlet to receive the dispersion of microdroplets from the dispersion outlet, the gelation vessel comprising an aqueous shell-forming solution, the aqueous shell-forming solution comprising water and a water soluble matrix-forming agent.

26. The method according to claim 1, wherein the channels comprise micro-channels.

27. The method according to claim 6, wherein the non-ionic surfactant comprises polyglycerol polyricinoleate (PGPR) and/or sorbitan ester.

28. The method according to claim 9, wherein the inorganic salt comprises an alkaline earth metal salt, an alkaline metal halide, an alkaline metal pseudohalide, an alkaline metal carboxylate and/or an alkaline metal nitrate.

* * * * *